(12) United States Patent
Alef et al.

(10) Patent No.: US 11,065,824 B2
(45) Date of Patent: Jul. 20, 2021

(54) DEVICE AND METHOD FOR PRODUCING PACKAGING PRECURSORS BY MEANS OF A HEATING DEVICE ACTING ON THE EDGE AREA OF THE PACKAGING PRECURSOR

(71) Applicant: SIG TECHNOLOGY AG, Neuhasen am Rheinfall (CH)

(72) Inventors: Ulrich Alef, Wegberg (DE); Martin Thomas, Hückelhoven (DE); Richard Leufen, Linnich (DE)

(73) Assignee: SIG TECHNOLOGY AG, Neuhasen am Rheinfall (CH)

( * ) Notice: Subject to any disclaimer, the term of this patent is extended or adjusted under 35 U.S.C. 154(b) by 13 days.

(21) Appl. No.: 16/329,737

(22) PCT Filed: Aug. 24, 2017

(86) PCT No.: PCT/EP2017/071308
§ 371 (c)(1),
(2) Date: Feb. 28, 2019

(87) PCT Pub. No.: WO2018/041706
PCT Pub. Date: Mar. 8, 2018

(65) Prior Publication Data
US 2019/0193341 A1    Jun. 27, 2019

(30) Foreign Application Priority Data

Aug. 31, 2016 (DE) ...................... 10 2016 216 460.0

(51) Int. Cl.
*B29C 65/00* (2006.01)
*B29C 65/08* (2006.01)
(Continued)

(52) U.S. Cl.
CPC .......... *B29C 66/4322* (2013.01); *B29C 65/08* (2013.01); *B29C 65/10* (2013.01);
(Continued)

(58) Field of Classification Search
CPC ..... B29C 65/10; B29C 65/103; B29C 65/106; B29C 65/12; B29C 66/1122;
(Continued)

(56) References Cited

U.S. PATENT DOCUMENTS 3,535,987 A    10/1970   Schafer et al.
3,847,540 A   *   11/1974   Farfaglia ............. B29C 66/4326
                                                                432/230

(Continued)

FOREIGN PATENT DOCUMENTS

DE            1924833 A1     12/1969
DE            02630460 A1     1/1978
(Continued)

OTHER PUBLICATIONS

[NPL-1] Henze et al. (DE19741340C1); Nov. 12, 1998, (EPO—Machine Translation to English). (Year: 1998).*
(Continued)

*Primary Examiner* — John L Goff, II
(74) *Attorney, Agent, or Firm* — Meunier Carlin & Curfman LLC

(57) ABSTRACT

The invention relates in general terms to a device for production of a packaging precursor, wherein the packaging precursor consists to an extent of at least 80% by weight, based on the packaging precursor (1000), of a sheetlike composite, wherein the sheetlike composite includes:
i. a composite plastic layer,
ii. a composite carrier layer,
iii. a first composite edge region,
iv. a second composite edge region,
(Continued)

Figure 4A:
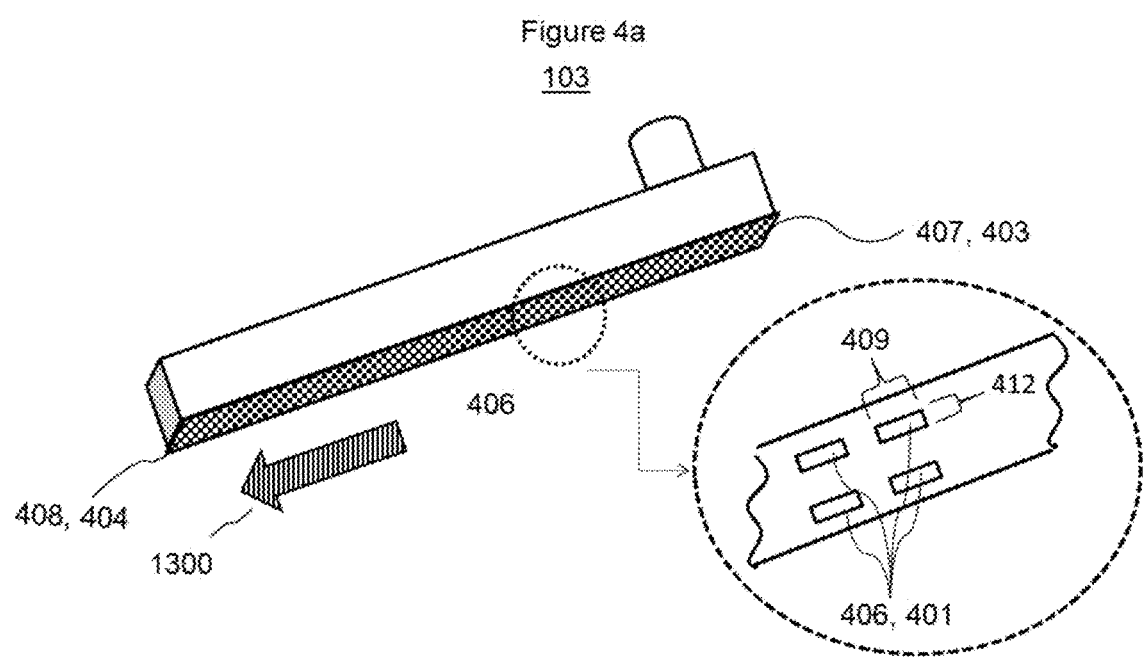

wherein the device includes, as device constituents in a flow direction:
a) a flat transport unit designed to transport the flat sheetlike composite, wherein the transport unit includes a transport surface designed to bear the composite; downstream of that
b) a first heating unit designed to heat the first composite edge region, where the first heating unit includes energy release segments; downstream of that
c) a contacting unit designed to bond the first composite edge region to the second composite edge region;

wherein the first heating unit is designed to release energy in the flow direction. The invention further relates to a method, to a packaging precursor obtainable by the method, to a packaging precursor and to a use of the device.

8 Claims, 11 Drawing Sheets

(51) Int. Cl.
| | | |
|---|---|---|
| *B29C 65/10* | (2006.01) | |
| *B29C 65/82* | (2006.01) | |
| *B32B 27/10* | (2006.01) | |
| *B32B 27/32* | (2006.01) | |
| *B29L 31/00* | (2006.01) | |

(52) U.S. Cl.
CPC ...... *B29C 65/8223* (2013.01); *B29C 66/0222* (2013.01); *B29C 66/0224* (2013.01); *B29C 66/112* (2013.01); *B29C 66/1122* (2013.01); *B29C 66/135* (2013.01); *B29C 66/232* (2013.01); *B29C 66/3452* (2013.01); *B29C 66/4326* (2013.01); *B29C 66/43122* (2013.01); *B29C 66/71* (2013.01); *B29C 66/7234* (2013.01); *B29C 66/72328* (2013.01); *B29C 66/73921* (2013.01); *B29C 66/919* (2013.01); *B29C 66/9141* (2013.01); *B32B 27/10* (2013.01); *B32B 27/32* (2013.01); *B29C 65/8215* (2013.01); *B29L 2031/7166* (2013.01); *B32B 2307/7265* (2013.01); *B32B 2439/70* (2013.01); *Y10T 156/17* (2015.01)

(58) Field of Classification Search
CPC ............ B29C 66/4322; B29C 66/4326; B29C 66/9141; B29C 66/919; B29C 66/91423; B31B 50/64; B31B 50/741; B31B 70/64; B31B 70/76; Y10T 156/17; B29L 2031/7166; B65B 51/10; B65B 51/20
USPC .......................... 156/217, 218, 497; 493/192
See application file for complete search history.

(56) References Cited

U.S. PATENT DOCUMENTS

| | | | |
|---|---|---|---|
| 5,236,408 A | | 8/1993 | McAdam, III et al. |
| 5,720,847 A | * | 2/1998 | Nagate .................... B29C 65/10 156/497 |

FOREIGN PATENT DOCUMENTS

| | | | | |
|---|---|---|---|---|
| DE | 07430127 U | | 6/1979 | |
| DE | 19741340 C1 | * | 11/1998 | ........... B29C 65/203 |
| DE | 19741340 C1 | | 11/1998 | |
| FR | 2459724 A1 | | 1/1981 | |
| GB | 02055743 A | | 3/1981 | |
| JP | H09141763 A | | 6/1997 | |
| JP | 2007-269353 A | | 10/2007 | |
| JP | 2009-120254 A | | 6/2009 | |
| JP | 2009-149364 A | | 7/2009 | |
| WO | 2014166932 A1 | | 10/2014 | |
| WO | WO-2014166932 A1 | * | 10/2014 | ............. B29C 65/10 |
| WO | 2016066592 A1 | | 5/2016 | |

OTHER PUBLICATIONS

International Search Report and Written Opinion, issued in the related international application No. PCT/EP2017/071308.
Office Action relating to European Application No. 17757539.3, dated Mar. 26, 2020.
Office Action relating to Chinese Application No. 201780051706.2, dated Jun. 24, 2020. 14 pages.
International Preliminary Report on Patentability issued in PCT//EP2017/071308, dated Mar. 14, 2019.

* cited by examiner

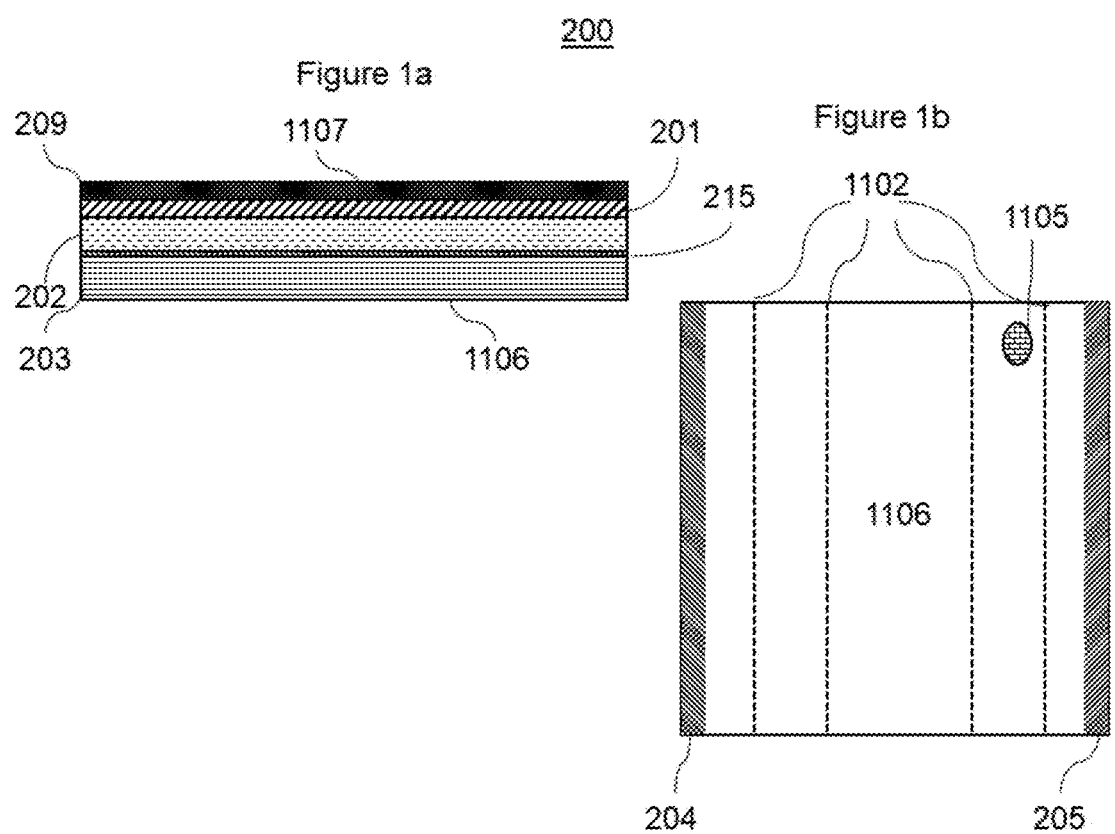

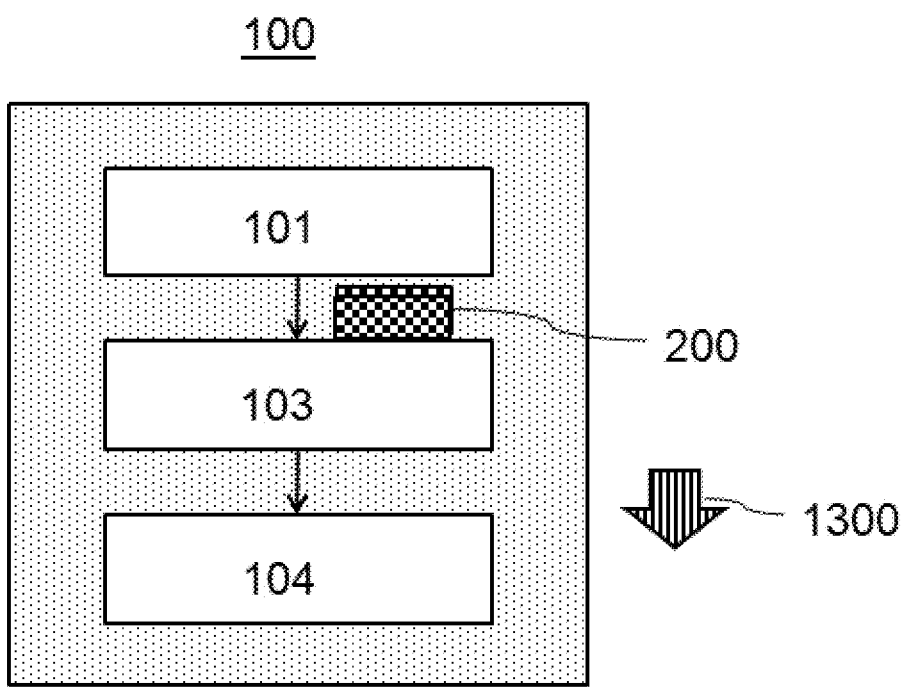

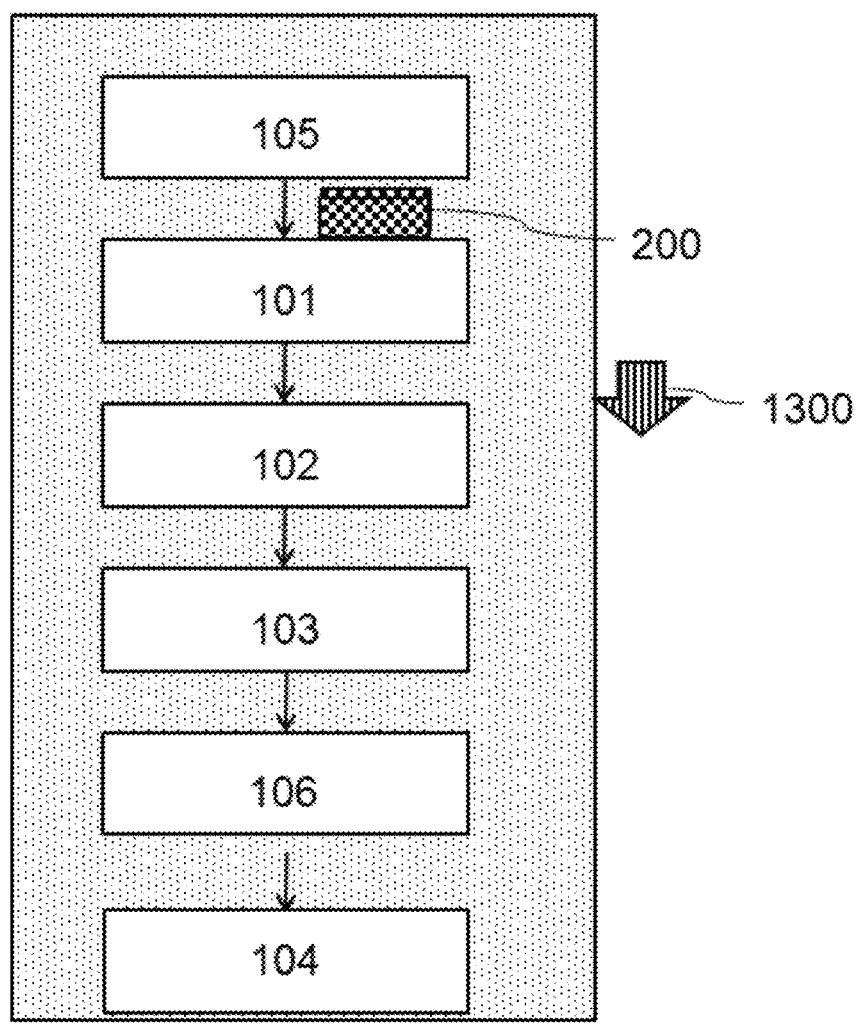

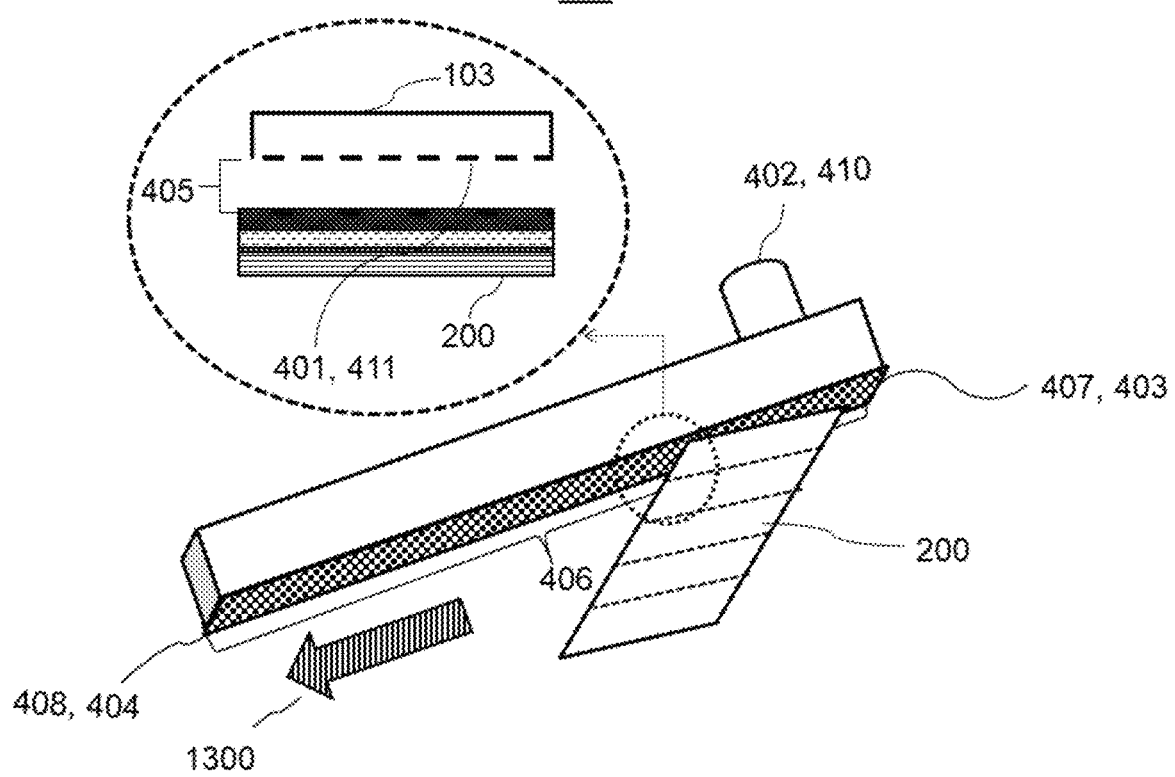

103

1000

1000

1200

DEVICE AND METHOD FOR PRODUCING PACKAGING PRECURSORS BY MEANS OF A HEATING DEVICE ACTING ON THE EDGE AREA OF THE PACKAGING PRECURSOR

The invention relates in general terms to a device for production of a packaging precursor, wherein the packaging precursor consists to an extent of at least 80% by weight, based on the packaging precursor, of a sheetlike composite, wherein the sheetlike composite includes:
  i. a composite plastic layer,
  ii. a composite carrier layer,
  iii. a first composite edge region,
  iv. a second composite edge region,
  wherein the device includes, as device constituents in a flow direction:
  a) a flat transport unit designed to transport the flat sheetlike composite, wherein the transport unit includes a transport surface designed to bear the composite; downstream of that
  b) a first heating unit designed to heat the first composite edge region, where the first heating unit includes energy release segments; downstream of that
  c) a contacting unit designed to bond the first composite edge region to the second composite edge region;
wherein the first heating unit is designed to release energy in the flow direction. The invention further relates to a method, to a packaging precursor obtainable by the method, to a packaging precursor and to a use of the device.

For some time, food and drink products, whether they be food and drink products for human consumption or else animal feed products, have been preserved by storing them either in a can or in a jar closed by a lid. In this case, shelf life can be increased firstly by separately and sterilizing the food or drink product and the container to the greatest possible degree in each case, here the jar or can, and then introducing the food or drink product into the container and closing the container. However, these measures for increasing the shelf life of food and drink products, which have been tried and tested over a long period, have a series of disadvantages, for example the need for another sterilization later on. Cans and jars, because of their essentially cylindrical shape, have the disadvantage that very dense and space-saving storage is not possible. Moreover, cans and jars have considerable intrinsic weight, which leads to increased energy expenditure in transport. In addition, production of glass, tinplate or aluminum, even when the raw materials used for this purpose are recycled, necessitates quite a high expenditure of energy. In the case of jars, an additional aggravating factor is elevated expenditure on transport. The jars are usually prefabricated in a glass factory and then have to be transported to the facility where the food and drink products are dispensed with the use of considerable transport volumes. Furthermore, jars and cans can be opened only with considerable expenditure of force or with the aid of tools and hence in a rather laborious manner. In the case of cans, there is a high risk of injury arising from sharp edges that occur on opening. In the case of jars, there are recurrent instances of broken glass getting into the food or drink product in the course of filling or opening of the filled jars, which in the worst case can lead to internal injuries when the food or drink product is consumed. In addition, both cans and jars have to be labeled for identification and promotion of the food or drink product contents. The jars and cans cannot readily be printed directly with information and promotional messages. In addition to the actual printing, a substrate for the purpose, a paper or a suitable film, is thus needed, as is a securing means, an adhesive or a sealant.

The prior art discloses dimensionally stable food and drink product containers made from multilayer laminates, also referred to here as sheetlike composites. The dimensional stability of the container is achieved by virtue of the laminate comprising a composite carrier layer which often consists of paperboard or cardboard. Food and drink products can be stored in such food and drink product containers over a long period with minimum impairment. Typically, the sheetlike composites are formed from a composite carrier layer usually consisting of paperboard or paper, an adhesion promoter layer, a barrier layer and a further polymer layer, as disclosed inter alia in WO 90/09926 A2. Typically, the above-described containers are provided with printed decoration on the outside. This allows the consumer of the food or drink product within the container to be provided with relevant information, for example ingredients of the food or drink product, directly on the container. In addition, the decoration serves for promotional purposes and for the configuration of a pleasing product appearance. In the prior art, the decoration is applied to the laminate by a thermoforming method prior to the folding.

With regard to the production of such composite packaging and the performance of the filling operation, essentially two different methods are known. In one method, the closed container is produced in a filling machine from a sheetlike composite via the intermediate step of a tube which is filled with food or drink product. In another embodiment, packaging precursors already provided with a longitudinal seam are first obtained by folding and sealing particular regions of the sheetlike composite. Subsequently, the packaging precursors are transported to the filling unit. The packaging precursors are produced at exceptionally high speed in order that high production rates per unit time are achieved.

In general terms, it is an object of the present invention to at least partly overcome a disadvantage that arises from the prior art. It is a further object of the invention to provide a device for the production of packaging precursors for food and drink product containers that features high production speeds and improved processability. It is a further object of the present invention to provide a device for the production of packaging precursors for food and drink product containers that leads to few defects in packaging precursor production. It is a further object of the invention to provide a device for the production of packaging precursors, wherein the effect of use of this device is that the longitudinal seam of the packaging precursors features a high seam strength of the internal seal. It is a further object of the invention to provide a device for the production of packaging precursors, wherein the effect of use of this device is that the longitudinal seam of the packaging precursors features a high seam strength of the external seal. It is a further object of the invention to provide a device for the production of packaging precursors, wherein the effect of use of this device is that the containers produced from the packaging precursors have lower bacterial contamination after the filling process in the filling machine. Another object of the invention is to provide a method that makes a contribution to the achievement of the objects addressed above in connection with the device of the invention. It is also an object of the invention to provide a method which features reduced energy expenditure during the production of the packaging precursors. In addition, it is also an object of the invention to provide a method which features high production speeds. It is also an object of the invention to provide a packaging precursor, the longitudinal seam of which features a high seam strength both in the internal seal and in the external seal. One or more of the above objects also arise in connection with the use of the device of the invention.

A contribution to the at least partial achievement of at least one of the above objects is made by the independent claims. The dependent claims provide preferred embodiments which contribute to the at least partial achievement of at least one of the objects.

A contribution to the achievement of at least one of the objects of the invention is made by an embodiment 1 of a device for production of a packaging precursor, wherein the packaging precursor consists to an extent of at least 80% by weight, based on the packaging precursor, of a sheetlike composite, wherein the sheetlike composite includes:
  i. a composite plastic layer,
  ii. a composite carrier layer,
  iii. a first composite edge region,
  iv. a second composite edge region,
wherein the device includes, as device constituents in a flow direction:
  a) a flat transport unit designed to transport the flat sheetlike composite, wherein the transport unit includes a transport surface designed to bear the composite; downstream of that
  b) a first heating unit designed to heat the first composite edge region, where the first heating unit includes energy release segments; downstream of that
  c) a contacting unit designed to bond the first composite edge region to the second composite edge region;
wherein the first heating unit is designed to release energy in the flow direction.

In one embodiment 2 of the invention, the device is configured according to embodiment 1, wherein the first heating unit includes, in the flow direction, a first energy release segment and, in the flow direction, a last energy release segment furthest removed from the first energy release segment. The first heating unit is preferably formed from metal, preferably having an iron content of at least 80% by weight, based on the metal. A preferred metal is stainless steel.

In one embodiment 3 of the invention, the device is configured according to embodiment 1 or 2, wherein the first energy release segment is designed to release a higher heating output than the last energy release segment. It is preferable here that the difference in the heating output between the first and last energy release segments is within a range from 0.2 to 10 kW/m, preferably within a range from 0.5 to 9 kW/m and more preferably within a range from 0.7 to 8 kW/m.

In one embodiment 4 of the invention, the device is configured according to any of embodiments 1 to 3, wherein the first energy release segment and the last energy release segment are at least 50 cm, preferably at least 60 cm, more preferably at least 70 cm, most preferably at least 80 cm apart. Occasionally, maximum distances of up to 600 cm are found.

In one embodiment 5 of the invention, the device is configured according to any of embodiments 1 to 4, wherein at least one energy release segment and preferably at least two, more preferably at least 5 and most preferably at least 10 energy release segments in flow direction have a length longer than the extent of the energy release segments transverse to flow direction. In the device of the invention, it is likewise possible that all energy release segments are designed such that they have a length in flow direction that is longer than the extent of the energy release segments transverse to flow direction.

In one embodiment 6 of the invention, the device is configured according to any of embodiments 1 to 5, wherein more than half, preferably at least 60%, more preferably at least 75%, most preferably at least 99%, of the energy release segments face the transport surface.

In one embodiment 7 of the invention, the device is configured according to any of embodiments 1 to 6, wherein the first heating unit includes an entry orifice through which gas can flow, wherein at least one, preferably at least two and more preferably all of the following criteria are fulfilled:
  a) the entry orifice is provided opposite the energy release segments;
  b) the entry orifice is provided with a smaller distance from the first energy release segment than from the last energy release segment;
  c) the entry orifice has a greater internal cross-sectional area than the sum total of the internal cross-sectional areas of all energy release segments.

Preferably, the entry orifice is connected to a hot gas source. It is advantageous when a hot gas source generates the hot gas by means of a gas burner, by means of an electrically operated heater, or a combination of the two.

In one embodiment 8 of the invention, the device is configured according to any of embodiments 1 to 7, wherein more than half, preferably at least 60%, more preferably at least 75%, most preferably at least 99%, of the energy release segments are designed as the exit orifice. Preferably, the exit orifice of the heating unit takes the form of a slot. More preferably, the exit orifice of the heating unit takes the form of at least two parallel slots. It is most preferred when the heating unit has a group of slots comprising at least two slots oriented in flow direction, where the distance between the two parallel slots of the exit orifice of the heating unit is at least 10 times the slot width.

In one embodiment 9 of the invention, the device is configured according to any of embodiments 1 to 8, wherein the distance between exit orifice and the transport surface is at most as great as the length of the exit orifices in flow direction.

In one embodiment 10 of the invention, the device is configured according to any of embodiments 1 to 9, wherein a peeling unit designed to reduce the layer thickness of the composite carrier layer is provided in the first composite edge region, between the transport unit and the first heating unit.

In one embodiment 11 of the invention, the device is configured according to any of embodiments 1 to 10, wherein an ionization unit is disposed between the heating unit and the contacting unit. It is preferable when a folding unit is additionally formed between the heating unit and the contacting unit. This preferably serves to produce at least one first fold in the sheetlike composite, preferably a longitudinal fold along the longest dimension of the sheetlike composite. It is further preferable when a further heating unit is designed to heat the second composite edge region.

In one embodiment 12 of the invention, the device is configured according to any of embodiments 1 to 11, wherein this device includes a sheetlike composite, wherein the sheetlike composite includes
  a composite plastic layer,
  a composite carrier layer,
  a first composite edge region,
  a second composite edge region.

A contribution to the achievement of at least one of the objects of the invention is made by an embodiment 1 of a method of producing a packaging precursor, comprising, as method steps, a. providing a sheetlike composite comprising
   a composite plastic layer,
   a composite carrier layer,
   a first composite edge region,
   a second composite edge region,
b. accelerating the sheetlike composite;
d. heating the first composite edge region;
e. bonding the first composite edge region to the second composite edge region, wherein, in method step d), a first temperature in a region between the transport surface and the first energy release segment is T1, and a second temperature in a further region, preferably downstream, between the transport surface and the last energy release segment is Tn. It is preferable when the first temperature T1 is greater than the second temperature Tn. It is further preferable when the temperature T1 is 30° C. greater, preferably 40° C. greater and most preferably 50° C. greater than the temperature Tn. Occasionally, the first temperature T1 may be up to 200° C. greater than the temperature Tn.

In one embodiment 2 of the invention, the method is configured according to embodiment 1, wherein method step d) includes heating by thermal convection. In this case, a gaseous heat flow preferably has a temperature within a range from 100 to 1200° C., preferably from 200 to 1000° C., more preferably from 300 to 900° C. and most preferably from 400 to 800° C.

In one embodiment 3 of the invention, the method is configured according to either of embodiments 1 and 2, wherein, in method step d), a gaseous heat flow at an exit orifice of the first heating unit has a greater flow rate than at the entry orifice of the first heating unit.

In one embodiment 4 of the invention, the method is configured according to any of embodiments 1 to 3, wherein the sheetlike composite is subjected to method step d) for not more than 0.5 second, preferably not more than 0.3 second, most preferably not more than 0.2 second.

In one embodiment 5 of the invention, the method is configured according to any of embodiments 1 to 4, wherein the sheetlike composite is accelerated in method step b) to a speed of at least 100 m/min, preferably to at least 200 m/min, most preferably to more than 300 m/min. It is advantageous in some cases to accelerate the sheetlike composite to a maximum of 800 m/min. The accelerating is preferably effected within less than one second, preferably within less than 0.5 second. It is further preferable when, prior to method step b), the sheetlike composite is individualized. A preferred individualization is pulling of a sheetlike composite from a multitude of stacked sheetlike composites.

In one embodiment 6 of the invention, the method is configured according to any of embodiments 1 to 5, wherein, in a method step c), the thickness of the sheetlike composite at least in a subregion of the first composite edge region is reduced by more than 40%, preferably by more than 45% and more preferably by more than 50% of the thickness of the sheetlike composite. It is advantageous in some cases to reduce the thickness of the sheetlike composite by a maximum of 75%. Otherwise, there is a risk of impairment of the stability of the packaging precursor. The subregion of the first composite edge region is preferably 40% to 95%, more preferably 50% to 85% and most preferably 60% to 75% of the area of the first composite edge region.

In one embodiment 7 of the invention, the method is configured according to any of embodiments 1 to 6, wherein, after method step d), the second composite edge region is heated with a further heating unit. It is preferable that the second composite edge region is heated in such a way that a second plastic layer present in the composite edge region is softened and preferably melts. The heating serves especially to facilitate the bonding, especially the sealing, of the second composite edge region to the first plastic layer via the second plastic layer. It is preferable here that the second plastic layer is heated at least above the glass transition temperature, preferably the melting temperature, of a polymer present in the plastic layer. This is preferably effected at a temperature within a range from 70 to 300° C., more preferably within a range from 75 to 250° C. and especially preferably within a range from 80 to 200° C.

A contribution to the achievement of at least one of the objects of the invention is made by an embodiment 1 of a packaging precursor obtainable by the method according to any of embodiments 13 to 19. A preferred packaging precursor is in shell form. It is preferable here that the packaging precursor in shell form is designed such that a single container can be formed in each case therefrom. This is by contrast with a tubular packaging precursor, without any need to individualize the packaging precursor after contact with a food or drink product, for example by cutting. It is thus preferable that the packaging precursor in shell form has the dimensions of a single container. It is further preferable that the packaging precursor in shell form has been folded. It is preferable here that two sheetlike composite plies in the folded packaging precursor in shell form come to rest against one another.

A contribution to the achievement of at least one of the objects of the invention is made by an embodiment 1 of a packaging precursor comprising a sheetlike composite,
wherein the sheetlike composite includes a first overlap region and a second overlap region;
wherein the first overlap region comprises a first layer sequence comprising, as mutually superposed layers from an inner surface of the sheetlike composite to an outer surface, a first composite carrier layer and a second composite carrier layer;
wherein the first composite carrier layer is bonded to the second composite carrier layer in the first overlap region;
wherein the second overlap region comprises a second layer sequence comprising, as mutually superposed layers from an inner surface of the sheetlike composite to an outer surface, a first composite carrier layer, a second composite carrier layer and a third composite carrier layer;
wherein the second composite carrier layer is bonded to the third composite carrier layer in the second overlap region;
wherein the second overlap region, between the second composite carrier layer and the third composite carrier layer, comprises, as mutually superposed layers from an inner surface of the sheetlike composite to an outer surface, a third composite plastic layer and a second composite plastic layer;
wherein the layer thickness of the third composite carrier layer in the second overlap region is greater than the respective layer thickness of the first composite carrier layer or of the second composite carrier layer or both;
wherein, in the first overlap region, between the first composite carrier layer and the second composite carrier layer, as mutually superposed layers from an inner surface of the sheetlike composite to an outer surface, a composite color layer is bonded to a composite plastic layer.

A composite plastic layer preferably includes at least one polyolefin, more preferably a polyethylene, more preferably a mixture of an LDPE and an m-PE (polyethylene produced by means of a metallocene catalyst). A preferred composite carrier layer consists of a fibrous material, preferably a plant-based fibrous material, especially a cellulose. The fibrous material or the cellulose has preferably been glued.

It is likewise possible to use unbleached fibrous materials or celluloses. Paper and paperboard are particularly preferred as composite carrier layer. The basis weight of the composite carrier layer is preferably within a range from 120 to 450 g/m$^2$.

In one embodiment 2 of the invention, the packaging precursor is configured according to embodiment 1, wherein the first overlap region and the second overlap region adjoin one another. It is preferable here that this is formed at least partly in a longitudinal seam. Preferably, the first overlap region and the second overlap region adjoin one another along at least 50%, preferably at least 75% and more preferably at least 95% of the longitudinal seam.

In one embodiment 3 of the invention, the packaging precursor is configured according to embodiments 1 and 2, wherein the composite carrier layer has a hole. This hole serves to form a covered hole which is used particularly for drinking straws or closures—also called fitments.

A contribution to the achievement of at least one of the objects of the invention is made by an embodiment 1 of a closed container obtainable by closing the packaging precursor according to any of embodiments 1 to 3. Preferably, the closed container comprises a lid or base that has been formed with the sheetlike composite, or both. A preferred closed container comprises a food or drink product.

A contribution to the achievement of at least one of the objects of the invention is made by an embodiment 1 of a use of a packaging precursor according to any of embodiments 1 to 3 produced with a device according to any of embodiments 1 to 11 for packaging of food and drink products.

A contribution to the achievement of at least one of the objects of the invention is made by an embodiment 1 of a use of the device according to any of embodiments 1 to 11 for production of a packaging precursor for packaging of food and drink products.

Preferred configurations of constituents of any category of the invention, especially of the device, the sheetlike composite, the packaging precursor, the method, the closed container, and the use, are likewise preferred for constituents of the same name or corresponding constituents of the respective other categories of the invention.

Transport Unit

In general, the transport unit of the invention serves to convey one or more sheetlike composites or packaging precursors, especially sheetlike composites during the transformation thereof to packaging precursors. In this connection, it is preferable that the transport unit is in flat form. A preferred, especially flat, transport unit at least partly takes the form of a conveyor belt or a roll conveyor or both. A preferred transport surface is a belt. A preferred belt is a continuous belt. It is additionally preferable when an individualization unit for individualization of the sheetlike composite is formed upstream of the transport unit. A preferred individualization is pulling of a sheetlike composite from a multitude of stacked sheetlike composites.

Contacting Unit

In general, the contacting unit of the invention serves to bond two regions of the sheetlike composite, especially in the transformation of the sheetlike composite to a packaging precursor. The contacting unit may be arranged and designed for chemical bonding, for example adhesive bonding, or physical bonding, for example sealing, or for chemical and physical bonding. A preferred contacting unit is a sealing station, preferably designed for sealing of the first composite edge region and the second composite edge region. Preferably, in the contacting unit, the first composite edge region is contacted with the second composite edge region to obtain a longitudinal seam. It is further preferable when the first composite edge region is opposite the second composite edge region.

Outer Surface

The outer surface of the sheetlike composite is the surface which faces predominantly outward in a container to be produced from the sheetlike composite. Accordingly, the outer surface is in direct contact with an environment of the container. In the sheetlike composite, the outer surface and the inner surface form mutually opposite surfaces of the sheetlike composite.

Layers

Two layers are joined to one another when their bonding to one another extends beyond van der Waals attraction forces. Layers that have been bonded to one another preferably belong to a category selected from the group consisting of sealed to one another, adhesively bonded to one another and compressed to one another, or a combination of at least two of these. Unless stated otherwise, in a layer sequence, the layers may follow one another indirectly, i.e. with one or at least two intermediate layers, or directly, i.e. with no intermediate layer. This is the case especially in the form of words in which one layer overlays another layer. A form of words in which a layer sequence comprises enumerated layers means that at least the layers specified are present in the sequence specified. This form of words does not necessarily mean that these layers follow on directly from one another. A form of words in which two layers adjoin one another means that these two layers follow on from one another directly and hence with no intermediate layer. However, this form of words does not specify whether or not the two layers have been bonded to one another. Instead, these two layers may be in contact with one another.

Composite Carrier Layer

The composite carrier layer used may be any material which is suitable for a person skilled in the art for this purpose and which has sufficient strength and stiffness to impart stability to the container to such an extent that the container in the filled state essentially retains its shape. This is especially a preferred feature of the composite carrier layer since the invention particularly relates to dimensionally stable containers. Composite carrier layers may consist of a number of plastics. A preferred composite carrier layer consists of a fibrous material, preferably a plant-based fibrous material, especially a cellulose. The fibrous material or the cellulose has preferably been glued. It is likewise possible to use unbleached fibrous materials or celluloses. Paper and paperboard are particularly preferred as composite carrier layer. The basis weight of the composite carrier layer is preferably within a range from 120 to 450 g/m$^2$, especially preferably within a range from 130 to 400 g/m$^2$ and most preferably within a range from 150 to 380 g/m$^2$. A preferred paperboard generally has a single-layer or multilayer structure and may have been coated on one or both sides with one or else more than one outer layer. In addition, a preferred paperboard has a residual moisture content of less than 20% by weight, preferably of 2% to 15% by weight and especially preferably of 4% to 10% by weight, based on the total weight of the paperboard. An especially preferred paperboard has a multilayer structure. Further preferably, the paperboard has, on the surface facing the environment, at least one lamina, but more preferably at least two laminas, of an outer layer known to the person skilled in the art as a "coating slip". In addition, a preferred paperboard has a Scott bond value within a range from 100 to 360 J/m$^2$, preferably from 120 to 350 J/m$^2$ and especially preferably from 135 to 310 J/m$^2$. By virtue of the aforementioned ranges, it is possible to provide a composite from which it is possible to fold a container with high integrity, easily and in low tolerances.

Barrier Layer

The barrier layer used may be any material which is suitable for a person skilled in the art for this purpose and which has sufficient barrier action against gases, especially with respect to oxygen. The barrier layer is preferably selected from
 a. a polymer barrier layer as electrically insulating barrier layer;
 b. a metal layer as electrically conductive barrier layer;
 c. a metal oxide layer; or
 d. a combination of at least two of a. to c.

If the barrier layer, according to alternative a., is a polymer barrier layer, this preferably comprises at least 70% by weight, especially preferably at least 80% by weight and most preferably at least 95% by weight of at least one polymer which is known to the person skilled in the art for this purpose, especially for aroma or gas barrier properties suitable for packaging containers. Useful polymers, especially thermoplastics, here include N- or O-bearing polymers, either alone or in mixtures of two or more. According to the invention, it may be found to be advantageous when the polymer barrier layer has a melting temperature within a range from more than 155 to 300° C., preferably within a range from 160 to 280° C. and especially preferably within a range from 170 to 270° C.

Further preferably, the polymer barrier layer has a basis weight within a range from 2 to 120 g/m$^2$, preferably within a range from 3 to 60 g/m$^2$, especially preferably within a range from 4 to 40 g/m$^2$ and further preferably from 6 to 30 g/m$^2$. Further preferably, the polymer barrier layer is obtainable from melts, for example by extrusion, especially laminar extrusion. Further preferably, the polymer barrier layer may also be introduced into the sheetlike composite via lamination. It is preferable in this context that a film is incorporated into the sheetlike composite. In another embodiment, it is also possible to select polymer barrier layers obtainable by deposition from a solution or dispersion of polymers.

Suitable polymers preferably include those having a weight-average molecular weight, determined by gel permeation chromatography (GPC) by means of light scattering, within a range from $3 \cdot 10^3$ to $1 \cdot 10^7$ g/mol, preferably within a range from $5 \cdot 10^3$ to $1 \cdot 10^6$ g/mol and especially preferably within a range from $6 \cdot 10^3$ to $1 \cdot 10^5$ g/mol. Suitable polymers especially include polyamide (PA) or polyethylene vinyl alcohol (EVOH) or a mixture thereof.

Among the polyamides, useful PAs are all of those that seem suitable to the person skilled in the art for the use according to the invention. Particular mention should be made here of PA 6, PA 6.6, PA 6.10, PA 6.12, PA 11 or PA 12 or a mixture of at least two of these, particular preference being given to PA 6 and PA 6.6 and further preference to PA 6. PA 6 is commercially available, for example, under the Akulon®, Durethan® and Ultramid® trade names. Additionally suitable are amorphous polyamides such as MXD6®, Grivory® and Selar® PA. It is further preferable that the PA has a density within a range from 1.01 to 1.40 g/cm$^3$, preferably within a range from 1.05 to 1.30 g/cm$^3$ and especially preferably within a range from 1.08 to 1.25 g/cm$^3$. It is further preferable that the PA has a viscosity number within a range from 130 to 250 mL/g and preferably within a range from 140 to 220 mL/g.

Useful EVOHs include all the EVOHs that seem suitable to the person skilled in the art for the use according to the invention. Examples of these are commercially available, inter alia, under the EVAL™ trade names from EVAL™ Europe NV, Belgium, in a multitude of different versions, for example the EVAL™ F104B or EVAL™ LR171B types. Preferred EVOHs have at least one, two, more than two or all of the following properties:
 an ethylene content within a range from 20 to 60 mol %, preferably from 25 to 45 mol %;
 a density within a range from 1.0 to 1.4 g/cm$^3$, preferably from 1.1 to 1.3 g/cm$^3$;
 a melting point within a range from more than 155 to 235° C., preferably from 165 to 225° C.;
 an MFR value (210° C./2.16 kg when $T_{S(EVOH)}$<230° C.; 230° C./2.16 kg when 210° C.<$T_{S(EVOH)}$<230° C.) within a range from 1 to 25 g/10 min, preferably from 2 to 20 g/10 min;
 an oxygen permeation rate within a range from 0.05 to 3.2 cm$^3 \cdot 20$ μm/m$^2 \cdot$day$\cdot$atm, preferably within a range from 0.1 to 1 cm$^3 \cdot 20$ μm/m$^2 \cdot$day$\cdot$atm.

Preferably at least one polymer layer, further preferably the composite plastic layer, or preferably all polymer layers, has/have a melting temperature below the melting temperature of the barrier layer. This is especially true when the barrier layer is formed from polymer. The melting temperatures of the at least one polymer layer, especially the composite plastic layer, and the melting temperature of the barrier layer preferably differ here by at least 1 K, especially preferably by at least 10 K, still more preferably by at least 50 K, even more preferably by at least 100 K. The temperature difference should preferably be chosen to be only of such an amount that there is no melting of the barrier layer, especially no melting of the polymer barrier layer, during the folding.

According to alternative b., the barrier layer is a metal layer. Suitable metal layers are in principle all layers comprising metals which are known to the person skilled in the art and which can provide high light opacity and oxygen impermeability. In a preferred embodiment, the metal layer may take the form of a foil or a deposited layer, for example after a physical gas phase deposition. The metal layer is preferably an uninterrupted layer. In a further preferred embodiment, the metal layer has a thickness within a range from 3 to 20 μm, preferably within a range from 3.5 to 12 μm and especially preferably within a range from 4 to 10 μm.

Metals selected with preference are aluminum, iron or copper. A preferred iron layer may be a steel layer, for example in the form of a foil. Further preferably, the metal layer is a layer comprising aluminum. The aluminum layer may appropriately consist of an aluminum alloy, for example AlFeMn, AlFe1.5Mn, AlFeSi or AlFeSiMn. The purity is typically 97.5% or higher, preferably 98.5% or higher, based in each case on the overall aluminum layer. In a particular configuration, the metal layer consists of an aluminum foil. Suitable aluminum foils have a ductility of more than 1%, preferably of more than 1.3% and especially preferably of more than 1.5%, and a tensile strength of more than 30 N/mm$^2$, preferably more than 40 N/mm$^2$ and especially preferably more than 50 N/mm$^2$. Suitable aluminum foils exhibit in the pipette test a droplet size of more than 3 mm, preferably more than 4 mm and especially preferably of more than 5 mm. Suitable alloys for producing aluminum layers or foils are commercially available under the designations EN AW 1200, EN AW 8079 or EN AW 8111 from Hydro Aluminium Deutschland GmbH or Amcor Flexibles Singen GmbH. In the case of a metal foil as a barrier layer, it is possible to provide an adhesion promoter layer between the metal foil and a closest polymer layer on one and/or both sides of the metal foil.

Further preferably, the barrier layer selected, according to alternative c., may be a metal oxide layer. Useful metal oxide layers include all metal oxide layers that are familiar and seem suitable to the person skilled in the art for achieving a barrier effect with respect to light, vapor and/or gas. Especially preferred are metal oxide layers based on the metals already mentioned above, aluminum, iron or copper, and those metal oxide layers based on titanium oxide or silicon oxide compounds. A metal oxide layer is produced by way of example by vapor deposition of metal oxide on a polymer layer, for example an oriented polypropylene film. A preferred process for this purpose is physical gas phase deposition.

In a further preferred embodiment, the metal layer of the metal oxide layer may take the form of a layer composite composed of one or more polymer layers with a metal layer. Such a layer is obtainable, for example, by vapor deposition of metal on a polymer layer, for example an oriented polypropylene film. A preferred process for this purpose is physical gas phase deposition.

Polymer Layers

The term "polymer layer" refers hereinafter especially to the composite plastic layer, the outer polymer layer and the polymer interlayer. An intermediate polymer layer refers here to a polymer layer between the composite carrier layer and the barrier layer. A preferred polymer is a polyolefin. The polymer layers may have further constituents.

The polymer layers may be obtained from all polymers or polymer mixtures that are known to the person skilled in the art, where the polymer layers or the polymers or polymer mixtures that form them should be suitable for bonding the individual polymer layers to the further constituents to give a sheetlike composite. Useful polymers include both homopolymers and copolymers, preference being given to the latter, since these can be adjusted accurately to the demands of the sheetlike composite in a particularly efficient manner via the choice of the suitable comonomer(s). Thermoplastic polymers or polymer mixtures are preferred. Among the thermoplastic polymers, polyolefins are particularly preferred. The polymer layers are preferably introduced into or applied to the sheetlike composite material in an extrusion method. The further constituents of the polymer layers are preferably constituents that do not adversely affect the behavior of the polymer melt on application as a layer. The further constituents may, for example, be inorganic compounds, such as metal salts, or further polymers, such as further thermoplastics. However, it is also conceivable that the further constituents are fillers or pigments, for example carbon black or metal oxides. Suitable thermoplastics for the further constituents especially include those that are readily processable by virtue of good extrusion characteristics. Among these, polymers obtained by chain polymerization are suitable, especially polyesters or polyolefins, particular preference being given to cyclic olefin copolymers (COCs), polycyclic olefin copolymers (POCs), especially polyethylene and polypropylene, and very particular preference to polyethylene. Among the polyethylenes, preference is given to HDPE (high density polyethylene), MDPE (medium density polyethylene), LDPE (low density polyethylene), LLDPE (linear low density polyethylene) and VLDPE (very low density polyethylene) and mixtures of at least two of these. It is also possible to use mixtures of at least two thermoplastics. Suitable polymer layers have a melt flow rate (MFR) within a range from 1 to 25 g/10 min, preferably within a range from 2 to 20 g/10 min and more preferably within a range from 2.5 to 15 g/10 min, and a density within a range from 0.890 g/cm$^3$ to 0.980 g/cm$^3$, preferably within a range from 0.895 g/cm$^3$ to 0.975 g/cm$^3$, and further preferably within a range from 0.900 g/cm$^3$ to 0.970 g/cm$^3$. The polymer layers preferably have at least one melting temperature within a range from 80 to 155° C., preferably within a range from 90 to 145° C. and more preferably within a range from 95 to 135° C.

Overlap Region

The overlap region generally serves to create a bond of two edge regions of the sheetlike composite in the packaging precursor and also in the container formed therefrom which resists the stresses, in the case of the packaging precursor, in the forming and filling of the container and, in the case of the filled container, those of the transport and which ensures protection of the food or drink product present therein. The overlap region is preferably obtained using the guide elements in the folding-over of the sheetlike composite. A preferred overlap region is a longitudinal seam of a packaging precursor.

Composite Color Layer

The general purpose of the composite color layer is to impart a decoration, an inscription or both to the sheetlike composite, then to the packaging precursor and ultimately to the finished container formed therefrom. The composite color layer preferably includes at least one colorant. A preferred composite color layer consists of a multitude of preferably printed halftone dots. Preferably, the composite color layer is applied on the side of the composite carrier layer of the sheetlike composite remote from the composite plastic layer. A preferred application method is intaglio printing.

Polyolefin

In general, the use of polyolefins serves to form a polymer layer. It is preferable here that polyolefins are particularly suitable for formation of a polymer layer. A preferred polyolefin is a polyethylene (PE) or a polypropylene (PP) or both. A preferred polyethylene is one selected from the group consisting of an LDPE, an LLDPE, and an HDPE, or a combination of at least two of these. A further preferred polyolefin is an mPolyolefin (polyolefin prepared by means of a metallocene catalyst). Suitable polyethylenes have a melt flow rate (MFR=MFI—melt flow index) within a range from 1 to 25 g/10 min, preferably within a range from 2 to 20 g/10 min and especially preferably within a range from 2.5 to 15 g/10 min, and a density within a range from 0.900 g/cm$^3$ to 0.980 g/cm$^3$, preferably within a range from 0.905 g/cm$^3$ to 0.975 g/cm$^3$, and further preferably within a range from 0.910 g/cm$^3$ to 0.970 g/cm$^3$.

mPolymer

An mPolymer is a polymer suitable for forming a polymer layer, preferably in mixtures with other polymers, preferably polyolefins. An mPolymer is prepared by means of a metallocene catalyst. A metallocene is an organometallic compound in which a central metal atom is arranged between two organic ligands, for example cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two of these, particular preference being given to mLLDPE.

Composite Plastic Layer

The composite plastic layer is based on thermoplastic polymers, where the composite plastic layer may include a particulate inorganic solid. However, it is preferable that the composite plastic layer comprises a thermoplastic polymer to an extent of at least 70% by weight, preferably at least 80% by weight and more preferably at least 95% by weight, based in each case on the total weight of the composite plastic layer. Preferably, the polymer or polymer mixture of the composite plastic layer has a density (to ISO 1183-1: 2004) within a range from 0.900 to 0.980 g/cm³, more preferably within a range from 0.900 to 0.975 g/cm³ and most preferably within a range from 0.900 to 0.970 g/cm³. It is preferable that the composite plastic layer, viewed from the carrier layer, in the sheetlike composite faces the interior of the container when a container has been formed from the sheetlike composite. The composite plastic layer is always in direct contact with the food or drink product in the container.

Extrusion

Extrusion generally serves for liquefaction and application or incorporation of the polymers in order to form the polymer layers of the sheetlike composite. In the extrusion, the polymers are preferably heated to temperatures of 210 to 350° C., measured in the molten polymer film beneath the exit from the extruder die. The extrusion can be effected by means of extrusion tools which are known to those skilled in the art and are commercially available, for example extruders, extruder screws, feed blocks, etc. At the end of the extruder, there is preferably an opening through which the polymer melt is pressed. The opening may have any shape that allows extrusion of the polymer melt to the composite precursor. For example, the opening may be angular, oval or round. The opening is preferably in the form of a slot of a funnel. In a preferred configuration of the method, application is effected through a slot. The slot preferably has a length within a range from 0.1 to 100 m, preferably within a range from 0.5 to 50 m, especially preferably within a range from 1 to 10 m. In addition, the slot preferably has a width within a range from 0.1 to 20 mm, preferably within a range from 0.3 to 10 mm, especially preferably within a range from 0.5 to 5 mm During the application of the polymer melt, it is preferable that the slot and the composite precursor move relative to one another. Preference is given to such a process wherein the composite precursor moves relative to the slot.

In a preferred extrusion coating method, the polymer melt is stretched during the application, this stretching preferably being effected by melt stretching, and most preferably by monoaxial melt stretching. For this purpose, the layer is applied to the composite precursor in the molten state by means of a melt extruder, and the layer applied, which is still in the molten state, is subsequently stretched in the preferably monoaxial direction, in order to achieve orientation of the polymer in this direction. Subsequently, the layer applied is left to cool for the purpose of heat-setting. In this context, it is especially preferable that the stretching is effected by at least the following application steps:

b1. emergence of the polymer melt as a melt film through at least one extruder die slot with an emergence rate $V_{out}$;
b2. application of the melt film to the composite precursor moving relative to the at least one extruder die slot with a movement rate $V_{pre}$;

where $V_{out} < V_{pre}$. It is especially preferable that $V_{pre}$ is greater than $V_{out}$ by a factor in the range from 5 to 200, especially preferably within a range from 7 to 150, further preferably within a range from 10 to 50 and most preferably within a range from 15 to 35. It is preferable here that $V_{pre}$ is at least 100 m/min, especially preferably at least 200 m/min and most preferably at least 350 m/min, but typically not more than 1300 m/min Once the melt layer has been applied to the composite precursor by means of the above-described stretching process, the melt layer is left to cool down for the purpose of heat-setting, this cooling preferably being effected by quenching via contact with a surface which is kept at a temperature within a range from 5 to 50° C., especially preferably within a range from 10 to 30° C.

In a further preferred configuration, the area which has emerged is cooled down to a temperature below the lowest melting temperature of the polymers provided in this area or its flanks, and then at least the flanks of the area are separated from this area. The cooling can be effected in any manner which is familiar to the person skilled in the art and seems to be suitable. Preference is given here too to the heat-setting which has already been described above. Subsequently, at least the flanks are separated from the surface. The separation can be conducted in any manner which is familiar to the person skilled in the art and seems to be suitable. Preferably, the separation is effected by means of a knife, laser beam or waterjet, or a combination of two or more thereof, the use of knives being especially preferable, especially knives for shearing.

Composite Edge Region

In general, the composite edge regions of the sheetlike composite serve to form a longitudinal seam of a packaging precursor. Preferably, the sheetlike composite has at least one first composite edge region and one second composite edge region. The first composite region is a subregion of the sheetlike composite. Preferably, the first composite edge region is on one side of the sheetlike composite. It is further preferable when the first composite edge region runs parallel to the longitudinal grooves in the sheetlike composite. A preferred first composite edge region has a width of not more than 30 mm, preferably of not more than 25 mm and most preferably of 23 mm. It is additionally advantageous when the first composite edge region is opposite the second composite edge region. In an advantageous execution, the first composite edge region and the second composite edge region form the first and second overlap regions and hence the longitudinal seam of a packaging precursor. The second composite edge region is a subregion of the sheetlike composite. Preferably, the second composite edge region is on one side of the sheetlike composite. It is further preferable when the second composite edge region runs parallel to the longitudinal grooves in the sheetlike composite. A preferred second composite edge region has a width of not more than 20 mm, preferably of not more than 17 mm and most preferably of 15 mm Peeling Unit In general, the peeling unit is configured and designed such that the sheetlike composite, especially the carrier layer, is reduced in diameter. What occurs here, in a peeling station, is that a strip of polyolefin or paperboard or both is mechanically removed, preferably peeled off, at one edge of the sheetlike composite. For this purpose, preference is given to using peeling knives, which more preferably rotate. Peeling knives of this kind and a peeling device that accommodates them are commercially available from Fortuna GmbH, Germany.

Heating Unit

A heating unit is designed to melt a polymer layer of the sheetlike composite. Preferably, a heating unit consists of metal. A preferred metal is a stainless steel. It is preferable when the heating unit, for energy release, includes at least one energy release segment, preferably at least 5, more preferably at least 10 and most preferably at least 50 energy release segments. It is further preferable when a multitude of the energy release segments are formed successively in flow direction. Preferred energy release segments contain at least one orifice. Preferred orifices are exit orifices. If the energy release segments contain exit orifices, the heating unit contains at least one entry orifice. A preferred medium has a lower flow rate at the at least one entry orifice than at the at least one exit orifice of the energy release segment.

Energy Release Segments

The energy release segments are designed to heat the regions of the sheetlike composite to be subjected to thermal treatment. The release of energy can be effected by means of radiation, by means of hot gas, by means of contact with a hot solid, by means of mechanical vibrations, preferably by means of ultrasound, or by means of a combination of at least two of these measures. More preferably, the thermal treatment is effected by irradiation, preferably electromagnetic radiation and especially preferably electromagnetic induction, or else by means of hot gas. Energy is released preferably in the form of thermal energy by the energy release segments. The thermal energy can be released directly by contacting the article to be heated or indirectly via a heated medium. A preferred medium is a hot gas. A preferred hot gas is air. Preferably, the air is heated by a gas burner or electrically.

Ionization Unit

With the aid of an ionization unit, an electron is detached from the shell of an atom or molecule in order to provide it to regions of the sheetlike composite that are to be treated. Ionization can be conducted with the aid of a flame treatment, a chemical treatment (e.g. fluorination), a corona treatment or a plasma treatment, or combinations of the methods. Preferably, the treatment is conducted on a polymer melt.

In the corona treatment, the sheetlike composite is subjected to an electrical high-voltage discharge via an electrode at close range. This involves operating a high-frequency generator with an AC voltage of 5 to 40 kV and a frequency between 5 and 80 kHz.

In plasma treatment, a plasma jet is used. A plasma jet is especially understood to mean a gas stream at least partly ionized by electrical discharge. Preference is given to using an atmospheric plasma jet. In a preferred embodiment, the plasma jet is generated by means of a high-frequency high voltage. The atmospheric plasma jet is preferably nonthermal, meaning that the ion temperature of the plasma jet is considerably below the electron temperature. In this way, a comparatively cool plasma jet, for example of an ion temperature of a few hundred degrees Celsius, preferably of less than 500° C., can be generated. Plasma sources used may be plasma nozzles.

Folding Unit

In general, the folding device serves to provide the sheetlike composite with folds or creases. These form the basis for the corners and edges of the container which is formed from the folded sheetlike composite. The folding unit preferably consists of guide elements configured to define the folding operation of the sheetlike composite around the material weakenings and to conduct it in a controlled manner. A preferred material weakening may be a groove or a perforation. A perforation may be a mechanical perforation or laser perforation. The guide elements may consist of rails. They may alternatively preferably be formed from belts. To promote a continuous folding operation, the guide elements are designed in flow direction such that more significant progress of the folding operation is defined in each case in flow direction.

Bonding/Adhesion Promoter Layer

An adhesion promoter layer, as opposed to a sealing layer, serves generally for adhesive bonding, preferably for chemical bonding. An adhesion promoter layer may be present between layers which do not directly adjoin one another, preferably between the barrier layer and the composite plastic layer. Useful adhesion promoters in an adhesion promoter layer include all polymers which are suitable for producing a firm bond through functionalization by means of suitable functional groups, through the forming of ionic bonds or covalent bonds with a surface of a respective adjacent layer. Preferably, these comprise functionalized polyolefins which have been obtained by copolymerization of ethylene with acrylic acids such as acrylic acid, methacrylic acid, crotonic acid, acrylates, acrylate derivatives or carboxylic anhydrides that bear double bonds, for example maleic anhydride, or at least two of these. Among these, preference is given to polyethylene-maleic anhydride graft polymers (EMAH), ethylene-acrylic acid copolymers (EAA) or ethylene-methacrylic acid copolymers (EMAA), which are sold, for example, under the Bynel® and Nucrer®0609HSA trade names by DuPont or the Escor®6000ExCo trade name by ExxonMobil Chemicals.

According to the invention, it is preferable that the bond between a composite carrier layer, a polymer layer or a barrier layer and the next layer in each case is at least 0.5 N/15 mm, preferably at least 0.7 N/15 mm and especially preferably at least 0.8 N/15 mm. In one configuration according to the invention, it is preferable that the bond between a polymer layer and a composite carrier layer is at least 0.3 N/15 mm, preferably at least 0.5 N/15 mm and especially preferably at least 0.7 N/15 mm. It is further preferable that the bond between a barrier layer and a polymer layer is at least 0.8 N/15 mm, preferably at least 1.0 N/15 mm and especially preferably at least 1.4 N/15 mm. If a barrier layer indirectly follows a polymer layer with an adhesion promoter layer in between, it is preferable that the bond between the barrier layer and the adhesion promoter layer is at least 1.8 N/15 mm, preferably at least 2.2 N/15 mm and especially preferably at least 2.8 N/15 mm. In a particular configuration, the bond between the individual layers is sufficiently strong that a composite carrier layer is torn apart in an adhesion test, called a paperboard fiber tear in the case of a paperboard as the composite carrier layer.

Outer Layer

A preferred outer layer is a "coating slip". A "coating slip" in papermaking is an outer layer comprising inorganic solid particles, preferably pigments and additives. The "coating slip" is preferably applied as a liquid phase, preferably as a suspension or dispersion, to a surface of a paper- or paperboard-containing layer. A preferred dispersion is an aqueous dispersion. A preferred suspension is an aqueous suspension. A further preferred liquid phase comprises inorganic solid particles, preferably pigments; a binder; and additives. A preferred pigment is selected from the group consisting of calcium carbonate, kaolin, talc, silicate, a polymer pigment and titanium dioxide. A preferred kaolin is a calcined kaolin. A preferred calcium carbonate is one selected from the group consisting of marble, chalk and a precipitated calcium carbonate (PCC) or a combination of at least two thereof. A preferred silicate is a sheet silicate. A preferred polymer pigment is spherical, preferably hollow spherical. A preferred binder is one selected from the group consisting of styrene-butadiene, acrylate, acrylonitrile, a starch and a polyvinyl alcohol or a combination of at least two thereof, preference being given to acrylate. A preferred starch is one selected from the group consisting of cationically modified, anionically modified and fragmented starch or a combination of at least two thereof. A preferred additive is one selected from the group consisting of a rheology modifier, a tinting dye, an optical brightener, a carrier for an optical brightener, a flocculating agent, a deaerator and a surface energy modifier or a combination of at least two thereof. A preferred deaerator is an emulsion paint deaerator, preferably based on silicone or based on fatty acids or both. A preferred surface energy modifier is a surfactant.

Packaging Precursor

A packaging precursor is a precursor of the closed container which arises in the course of production of a closed container. In this context, the packaging precursor comprises the sheetlike composite in the form of a blank. In this context, the sheetlike composite may be in an unfolded or folded state. A preferred packaging precursor has been cut to size and is designed for production of a single closed container. A preferred packaging precursor which has been cut to size and is designed for production of a single closed container is also referred to as a shell or sleeve. In this context, the shell or sleeve comprises the sheetlike composite in folded form. Moreover, the shell or sleeve comprises a longitudinal seam and is open in a top region and a base region. A typical packaging precursor which has been cut to size and is designed for production of a multitude of closed containers is often referred to as a tube.

A further preferred packaging precursor is open, preferably in a top region or a base region, more preferably in both. A preferred packaging precursor is in the form of a shell or tube or both. A further preferred packaging precursor comprises the printed sheetlike composite in such a way that the printed sheetlike composite has been folded at least once, preferably at least twice, more preferably at least 3 times, most preferably at least 4 times. A preferred packaging precursor is in one-piece form. More preferably, a base region of the packaging precursor is in a one-piece design with a lateral region of the packaging precursor.

Container

In general, the container here serves to accommodate food or drink products. The closed container according to the invention may have a multitude of different forms, but preference is given to an essentially cuboidal structure. In addition, the full area of the container may be formed from the sheetlike composite, or it may have a two-part or multipart construction. In the case of a multipart construction, it is conceivable that, as well as the sheetlike composite, other materials are also used, for example plastic, which can be used especially in the top or base regions of the container. In this context, however, it is preferable that the container is formed from the sheetlike composite to an extent of at least 50%, especially preferably to an extent of at least 70% and further preferably to an extent of at least 90% of the area. In addition, the container may have a device for emptying the contents. This may be formed, for example, from a polymer or mixture of polymers and be attached on the outer surface of the container. It is also conceivable that this device has been integrated into the container by "direct injection moulding". In a preferred configuration, the container according to the invention has at least one edge, preferably from 4 to 22 or else more edges, especially preferably from 7 to 12 edges. Edges in the context of the present invention are understood to mean regions which arise in the folding of a surface. Examples of edges include the longitudinal contact regions between two wall surfaces of the container in each case, also referred to as longitudinal edges herein. In the container, the container walls are preferably the surfaces of the container framed by the edges. Preferably, the interior of a container according to the invention comprises a food or drink product. Preferably, the closed container does not comprise any lid or base, or either, that has not been formed in one piece with the sheetlike composite. A preferred closed container comprises a food or drink product.

Food or Drink Product

A preferred closed container according to the invention comprises a food or drink product. Food and drink products include all kinds of food and drink products known to those skilled in the art for human consumption and also animal feeds. Preferred food and drink products are liquid above 5° C., for example milk products, soups, sauces, non-carbonated drinks. The container or the packaging precursor can be filled in various ways. Firstly, the food or drink product and the container or the packaging precursor can be very substantially sterilized separately prior to the filling, by means of suitable measures such as the treatment of the container or the packaging precursor with $H_2O_2$, UV radiation or other suitable high-energy radiation, plasma treatment or a combination of at least two of these, and the heating of the food or drink product, and then introduced into the container or the packaging precursor. This method of filling is frequently referred to as "aseptic filling" and is preferred in accordance with the invention. A further widespread method, in addition to or else instead of aseptic filling, is that the container or packaging precursor filled with food or drink product is heated to reduce the microbe count. This is preferably effected by pasteurizing or autoclaving. In this mode of operation, it is also possible to use less sterile food or drink products and containers or packaging precursors.

Hole/Opening Aid

In order to facilitate the opening of the closed container of the invention, a composite carrier layer may have at least one hole. In a particular configuration, the hole is covered by at least one barrier layer, and preferably a polymer layer, as hole-covering layers. In addition, one or more further layers, especially adhesion promoter layers, may be provided between the layers already mentioned. It is preferable here that the hole-covering layers are at least partly joined to one another, preferably to an extent of at least 30%, preferably at least 70% and more preferably to an extent of at least 90% of the area formed by the hole. In a particular configuration, it is preferable that the hole penetrates the entire sheetlike composite and is covered by a closure or opening device that closes the hole. In connection with a preferred embodiment, the hole provided in the composite carrier layer may have any shape which is known to those skilled in the art and is suitable for various closures, drinking straws or opening aids. Usually, a closed container is opened by at least partial destruction of the hole-covering layers that cover the hole. This destruction can be effected by cutting, pressing into the container or pulling out of the container. The destruction can be effected by means of an openable closure which is connected to the container and is arranged in the region of the hole, usually above the hole, or a drinking straw which is punctured by the hole-covering layers that cover the hole.

In a further preferred embodiment, a composite carrier layer of the sheetlike composite has a multitude of holes in the form of a perforation, wherein the individual holes are covered at least by a barrier layer, and preferably a polymer layer, as hole-covering layers. A container produced from such a composite can then be opened by tearing along the perforation. Holes of this kind for perforations are preferably produced by means of a laser. Particular preference is given to the use of laser beams when a metal foil or a metalized foil is being used as barrier layer. It is further possible that the perforation is introduced by mechanical perforation tools usually having blades.

In a further preferred embodiment, the sheetlike composite is subjected to a thermal treatment at least in the region of the at least one hole. In the case of a plurality of holes in the composite carrier layer that are present in the form of a perforation, it is especially preferable to conduct this thermal treatment around the edge region of the hole as well. The thermal treatment can be effected by means of radiation, by means of hot gas, by means of contact with a hot solid, by means of mechanical vibrations, preferably by means of ultrasound, or by means of a combination of at least two of these measures. More preferably, the thermal treatment is effected by irradiation, preferably electromagnetic radiation and especially preferably electromagnetic induction, or else by means of hot gas. The optimal operating parameters to be chosen in each case are known to the person of average skill in the art.

Producing a Fold

A fold is preferably produced along a groove if an internal angle, enclosed by fold regions of the sheetlike composite which adjoin one another along the groove, deviates from 180° by at least 10° for the first time as a result of folding. In the course of production of the fold by folding by at least 10° for the first time along the groove as described above, the carrier layer in particular is weakened along the fold.

Internal Seal

The internal seal is the seal between the composite plastic layer in the region of the first composite edge region and the composite plastic layer in the region of the second composite edge region. A preferred internal seal does not have any pockets or unevenness along the seal seam. In addition, a preferred internal seal has a maximum seam strength of at least 10 N/15 mm External Seal The external seal is the seal between the outer color layer in the region of the first composite edge region and the composite plastic layer in the region of the second composite edge region. A preferred external seal is obtained by a combination of temperature-ionization treatment. In addition, a preferred external seal has a maximum seam strength of at least 50 N/15 mm Colorant Colorants generally serve for application of decorations, numbers or letters to the outside of the sheetlike composite. According to DIN 55943:2001-10, colorant is the collective term for all coloring substances, especially for dyes and pigments. A preferred colorant is a pigment. A preferred pigment is an organic pigment. Pigments that are notable in connection with the invention are especially the pigments mentioned in DIN 55943:2001-10 and those mentioned in "Industrial Organic Pigments, Third Edition" (Willy Herbst, Klaus Hunger Copyright © 2004 WILEYVCH Verlag GmbH & Co. KGaA, Weinheim ISBN: 3-527-30576-9). It is often the case that pigments of this kind are formulated in printing inks, in which not only the pigments but also waxes, oils, thixotropic agents and other constituents customary for printing inks are provided.

Test Methods

The following test methods were used within the context of the invention. Unless stated otherwise, the measurements were conducted at an ambient temperature of 25° C., an ambient air pressure of 100 kPa (0.986 atm) and a relative air humidity of 50%.

MFR

MFR is measured according to standards DIN EN ISO 1133-1 (2012-03) and DIN EN ISO 1133-2 (2012-03) (unless stated otherwise at 190° C. and 2.16 kg).

Density

Density is measured according to standard DIN EN ISO 1183-1 (2013-04).

Melting Temperature

Melting temperature is determined on the basis of the DSC method DIN EN ISO 11357-1, -5 (2010-03). The instrument is calibrated according to the manufacturer's instructions on the basis of the following measurements:
temperature of indium onset temperature,
heat of fusion of indium,
temperature of zinc onset temperature.

Viscosity Number of PA

The viscosity number of PA is measured according to the standard DIN EN ISO 307 (2013-08) in 95% sulfuric acid.

Oxygen Permeation Rate

Oxygen permeation rate is determined according to standard DIN 53380 (1998-07) at 20° C. and 50% relative air humidity.

Moisture Content of Paperboard

The moisture content of the paperboard is measured according to the standard ISO 287:2009.

Bonding

The bond of two adjacent layers is determined by fixing them in a 90° peel test instrument, for example the Instron "German rotating wheel fixture", on a rotatable roller which rotates at 40 mm/min during the measurement. The samples had been cut beforehand into strips 15 mm wide. On one side of the sample, the laminas are detached from one another and the detached end is clamped in a tensile device directed vertically upward. A measuring instrument to determine the tensile force is attached to the tensile device. As the roller rotates, the force needed to separate the laminas from one another is measured. This force corresponds to the bonding of the layers to one another and is reported in N/15 mm. The separation of the individual layers can be effected mechanically, for example, or by means of a controlled pretreatment, for example by soaking the sample in 30% acetic acid at 60° C. for 3 min.

Molecular Weight Distribution

Molecular weight distribution is measured by gel permeation chromatography by means of light scattering: ISO 16014-3/-5 (2009-09).

Sterile Test

To conduct the sterile test, the packaging precursors (1000) are folded up in a filling machine, the base region (1104) is formed and filled with a food or drink product (1201), and finally the top region (1104) is formed. The base region is formed by closing the base region (1104) with hot air, and the top region (1103) is formed by means of sealing with ultrasound in a filling machine (e.g. CFA712, SIG Combibloc, Germany). 1000 package containers are filled with skimmed milk in an aseptic zone between the sealing of the base region with hot air and the closing of the top region with ultrasound.

Auxiliaries Required for the Laboratory Studies:
100 or 150 W soldering iron
0.1-1 mL pipettes
9 cmØ plastic petri dishes
incubator (30° C.)
plate count agar (Merck 105 463, Oxoid CM 325, Difco 247940)
sterile workbench Sampling:

Before the laboratory study is conducted, the skimmed milk-filled package containers must have been incubated at 30° C. for at least 3 days. The package containers to be examined are disinfected with alcohol at the top seal and then opened with a hot soldering iron. 0.1 mL of milk is withdrawn through the opening and introduced into a sterile petri dish filled with about 10 mL of plate count agar. After mixing and solidification of the agar, the petri dishes are incubated at 30° C. and 55° C. for at least 48 h and checked for growth. The petri dishes should be incubated upside down in order that formation of water of condensation on the nutrient medium is avoided. Colony-forming units (CFU) can then be identified by eye or microscope. If not more than ten CFU per petri dish are found in the laboratory studies, the sample is considered to be sterile. If more than ten CFU per petri dish are found in the laboratory studies, the package container is considered to be microbe-contaminated.

Seam Strength of the External Seal and Internal Seal

Testing Media:

Safety guillotine

TIRA test 27025 universal tensile tester

Sampling and Preparation:

First of all, the package is emptied, cleaned, divided and dried. By means of the safety guillotine, 3 samples (1400) in each case for the measurement of the external seal and the internal seal for the seam strength are cut out of the shell to be tested with a length of 50 mm and a width of 15 mm For the measurement of the seam strength of the internal seal, the external seal is opened by hand and the samples are then analyzed.

Test Details:

The samples are clamped into the universal tensile tester (load cell: 1 kN) by the 15 mm edges and pulled at a speed of 40 mm/min. In the course of this, the force-distance diagram is recorded. The clamped length is 35 mm, the testing distance 15 mm Result:

The arithmetic mean of the maximum force in the force-distance curve is formed from the 3 samples.

The invention is now illustrated by nonlimiting examples and figures.

EXAMPLES

Production of the Sheetlike Composite

The sheetlike composites of the examples (inventive) and comparative examples (noninventive) are produced with the layer sequence which follows by a layer extrusion process with a conventional extrusion coating system (from Davis Standard, LLC, USA). In the first step, the outer polymer layer is applied to the composite carrier layer. In a further step, a composite plastic layer is applied on the side of the composite carrier layer remote from the outer polymer layer. For application of the individual plastic layers, the polymers or polymer blends are melted in an extruder. In the case of application of one polymer or polymer blend in a layer, the resultant melt is transferred via a feed block into a nozzle and extruded onto the carrier layer. In the case of application of two or more polymers or polymer blends in a layer, the resultant melts are combined by means of a feed block and then co-extruded onto the carrier layer. For production of the sheetlike composite (200), the composite carrier layer (202, 207, 208, 210, 211, 212) used was a liquid packaging board (Natura T Duplex double-coated, from Stora Enso, Sweden). The outer polymer layer consists of an LDPE (19N430, Ineos, Germany). All the aforementioned composite plastic layers consist of a mixture of an LDPE (70% by weight of 19N430, Ineos, Germany) and an mPE (30% by weight, Affinity 1451, Dow, Belgium).

In a further process step, the outer polymer layer is covered with a composite color layer with the aid of a thermoforming method (cf. FIG. 1a). The composite color layer (209) consists of an intaglio printing color system (MAS, Hartmann, Germany) Subsequently, the sheetlike composite is provided with grooves and cut into the dimensions of a single container (cf. FIG. 1b). The sheetlike composite is then supplied to a folded-box bonding machine (cf. FIGS. 3 and 4). A Diana folded-box bonding machine from the Heidelberg company, Heidelberg, Germany is used, which, according to the details which follow, was modified with an individualization unit (105), a transport unit (101), a peeling unit (102), a heating unit (103), an ionization unit (106) and a contacting unit (104) for production of a packaging precursor of the invention.

TABLE 1

Characterization of container precursor production processes according to examples and comparative examples

| | Temperature T1 (403) [° C.] | Temperature Tn (404) [° C.] | Distance between first (407) and last (408) energy release segment [cm] | Ratio of length (409) [mm]/width (412) [mm] of the energy release segment in flow direction | Internal cross-sectional area of the entry region (410) [mm$^2$] | Sum total of the internal cross-sectional area of the exit orifices (411) [mm$^2$] |
|---|---|---|---|---|---|---|
| Comparative example 1 | 440 | 480 | 100 | 10 | 800 | 250 |
| Comparative example 2 | 480 | 480 | 100 | 10 | 800 | 250 |
| Comparative example 3 | 480 | 460 | 30 | 10 | 800 | 80 |
| Comparative example 4 | 480 | 470 | 10 | 10 | 800 | 25 |
| Comparative example 5 | 480 | 440 | 100 | 0.6 | 800 | 250 |
| Comparative example 6 | 480 | 440 | 100 | 0.2 | 800 | 250 |
| Comparative example 7 | 480 | 440 | 100 | 10 | 200 | 250 |
| Comparative example 8 | 480 | 440 | 100 | 10 | 100 | 250 |
| Example 1 | 480 | 450 | 50 | 10 | 500 | 120 |
| Example 2 | 480 | 440 | 100 | 10 | 800 | 250 |
| Example 3 | 480 | 435 | 120 | 10 | 900 | 300 |

TABLE 1-continued

Characterization of container precursor production processes
according to examples and comparative examples

|  | Temperature T1 (403) [° C.] | Temperature Tn (404) [° C.] | Distance between first (407) and last (408) energy release segment [cm] | Ratio of length (409) [mm]/width (412) [mm] of the energy release segment in flow direction | Internal cross-sectional area of the entry region (410) [mm²] | Sum total of the internal cross-sectional area of the exit orifices (411) [mm²] |
|---|---|---|---|---|---|---|
| Example 4 | 480 | 420 | 145 | 10 | 1000 | 360 |
| Example 5 | 480 | 410 | 200 | 15 | 1200 | 500 |
| Example 6 | 480 | 440 | 100 | 15 | 800 | 250 |

TABLE 2

Characterization of container precursors and container production
processes according to examples and comparative examples

|  | Max. seam strength of internal seal [N/15 mm] | Max. seam strength of external seal [N/15 mm] | Microbe-contaminated package containers per 1000 packaging precursors | Faulty production per 1000 packaging precursors | Max. production speed [m/min] |
|---|---|---|---|---|---|
| Comparative example 1 | 3 | 17 | 34 | 365 | 120 |
| Comparative example 2 | 4 | 18 | 45 | 255 | 123 |
| Comparative example 3 | 3 | 16 | 5 | 450 | 115 |
| Comparative example 4 | 1 | 12 | 27 | 570 | 90 |
| Comparative example 5 | 5 | 35 | 5 | 180 | 205 |
| Comparative example 6 | 4 | 15 | 25 | 340 | 140 |
| Comparative example 7 | 5 | 16 | 7 | 125 | 240 |
| Comparative example 8 | 2 | 14 | 31 | 180 | 175 |
| Example 1 | 13 | 123 | 0 | 4 | 400 |
| Example 2 | 21 | 156 | 0 | 0 | 550 |
| Example 3 | 23 | 187 | 0 | 0 | 530 |
| Example 4 | 20 | 165 | 0 | 2 | 500 |
| Example 5 | 28 | 167 | 0 | 1 | 490 |
| Example 6 | 24 | 181 | 0 | 0 | 550 |

The faulty production predominantly results from inadequate external sealing. This results in faults in the transport of the packaging precursors, but also in soiling as a result of abrasion on the constituents of the device.

It can be inferred from tables 1 and 2 that the inventive examples constitute advantageous effects over the comparative examples. For instance, it is possible to produce container precursors with greater seam strength of the internal and external seal. In addition, the filled containers of the invention are less microbe-contaminated than the comparative containers, and it is possible to produce packaging precursors at higher production rates with lower fault rates.

FIGURES

Figure 5:
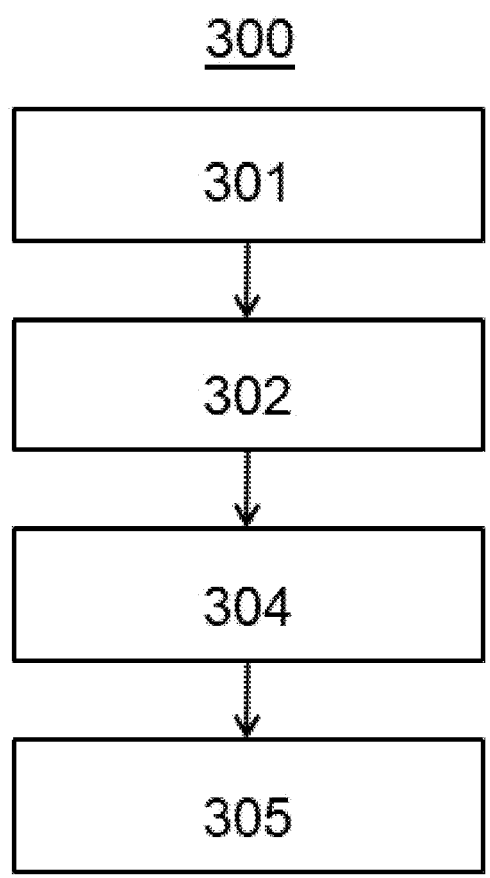
Figure 6:
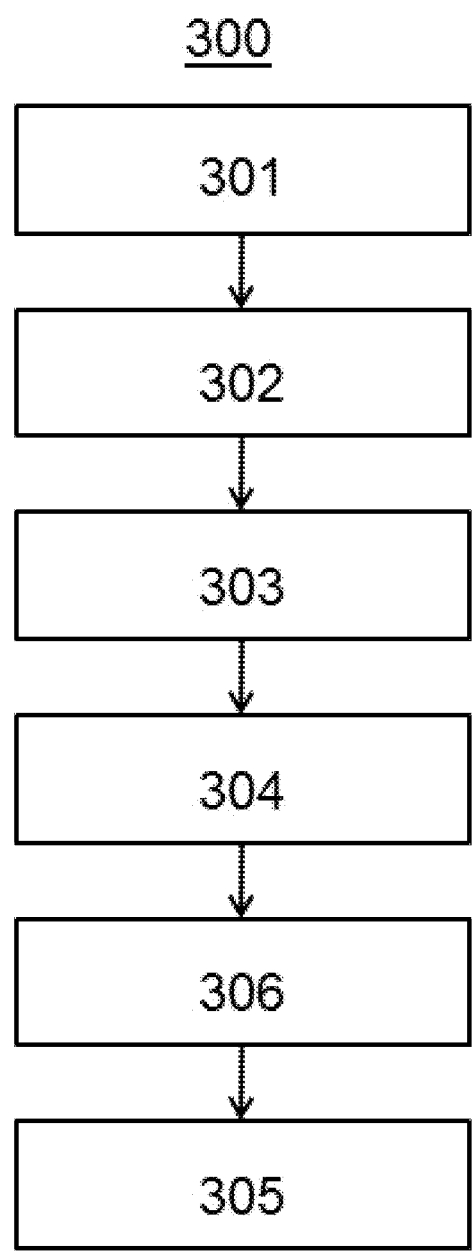
Figure 7:
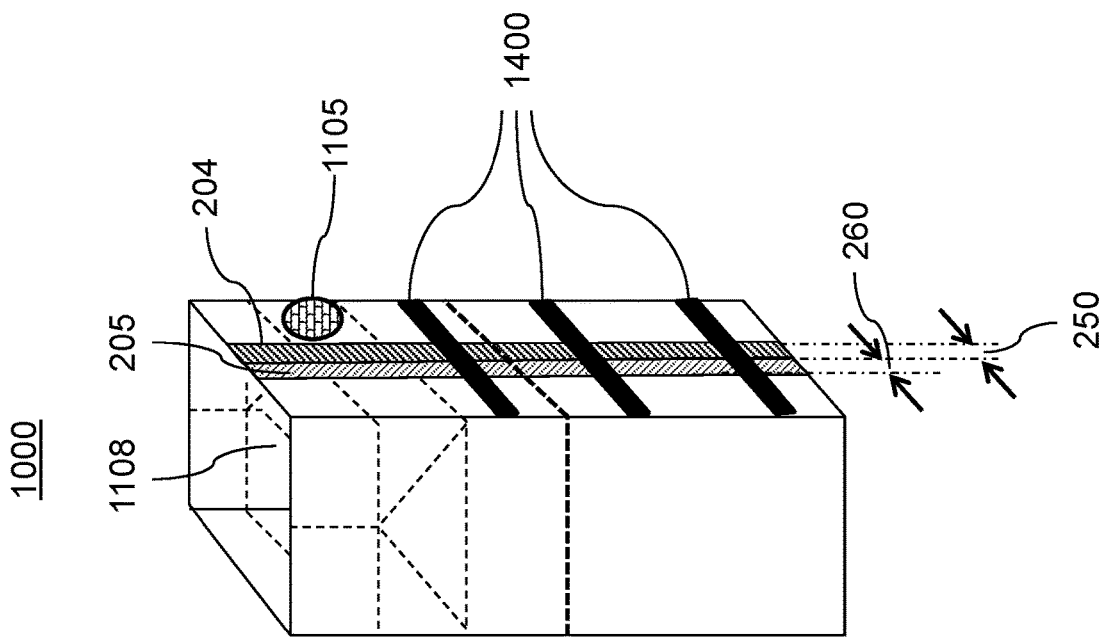
Figure 8:
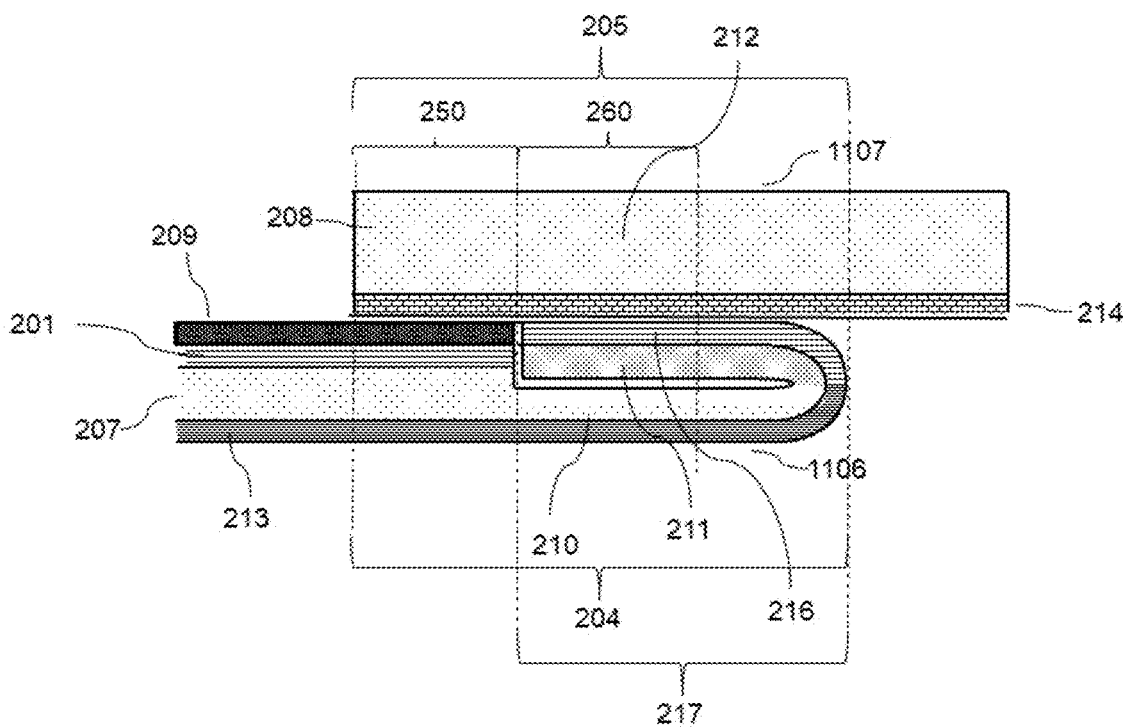
Figure 9:
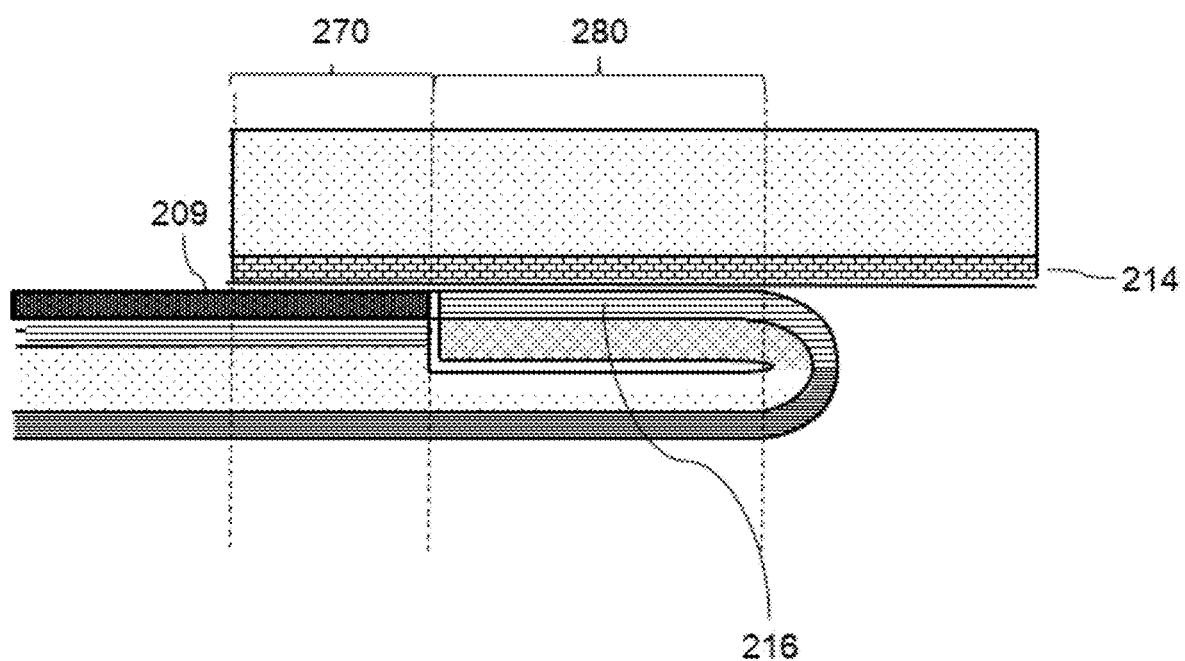
Figure 10:
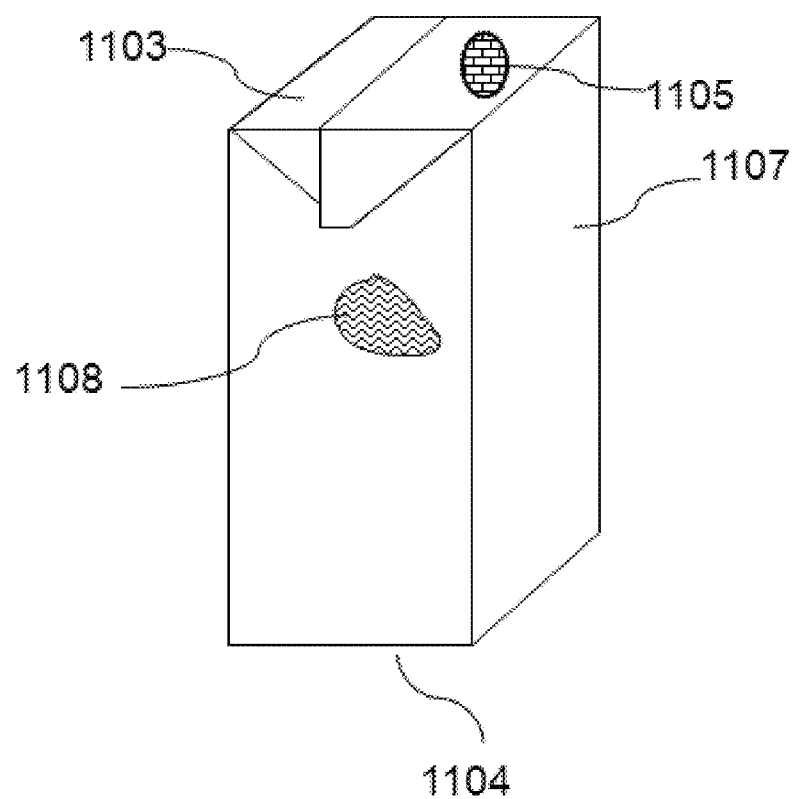

The figures respectively show, in schematic form and not to scale, unless stated otherwise in the description or the respective figure:

FIG. 1a a schematic cross section of a sheetlike composite
FIG. 1b a schematic top view of a sheetlike composite
FIG. 2 a device of the invention
FIG. 3 a further device of the invention
FIG. 4 a schematic diagram of the heating unit
FIG. 4a a schematic diagram of the shape of the exit orifices
FIG. 5 a flow diagram of a method according to the invention
FIG. 6 a flow diagram of a further method according to the invention
FIG. 7 a container precursor of the invention in top view (upright)
FIG. 8 a schematic cross section of a container precursor in the region of the longitudinal seam
FIG. 9 a schematic cross section of a container precursor in the region of the longitudinal seam to show the external seal and the internal seal
FIG. 10 a closed container of the invention FIG. 1a shows a sheetlike composite (200) in cross section. The sheetlike composite (200) includes, as a layer sequence from an outer surface (1107), which faces the environment in the finished container, of the sheetlike composite to an inner surface, which faces the food or drink product accommodated by the container in the finished container, of the sheetlike composite (1106): a composite color layer (209), an outer polymer layer (201) of LDPE, a composite carrier layer (202) of paperboard, a barrier layer (215) and a composite plastic layer (203) of LDPE. In addition, FIG. 1b shows a top view of the cut sheetlike composite (200) that has been provided with grooves (1102)

before it goes through the device (100) of the invention, with the first composite edge region (204) and the second composite edge region (205), and a covered hole (1105).

FIG. 2 shows a first embodiment of the device (100) of the invention. The device consists of a modified Diana folded-box bonding machine from the Heidelberg company, Heidelberg, Germany. The device (100) includes a sheetlike composite (200) which includes the layer sequence according to FIG. 1a. In addition, the sheetlike composite (200) includes a first composite edge region (204) and a second composite edge region (205) as shown in FIG. 1b. In addition, the device (100) includes a multitude of drive belts for transport of the sheetlike composite (200), which are designed to transport the sheetlike composite (200) in flow direction (1300) to a first heating unit (103). The transport is at 300 m/min. The first heating unit (103) is designed to heat the first composite edge region (204). This first heating unit (103) is a hot air nozzle made of stainless steel as shown in FIG. 4. The hot air nozzle has a length of 100 cm and is designed with 70 exit orifices (401) that have a length (mm)/width (mm) ratio of 10. The internal cross section of the entry region (410) is 500 mm², and the sum total of the internal cross-sectional areas of the exit orifices (411) is 120 mm². The sheetlike composite is then transported further with a multitude of drive belts to a contacting unit (104). The contacting unit (104) is designed to contact the first composite edge region (204) with the second composite edge region (205). The contacting unit (104) is a sealing station that seals the first composite edge region (204) and the second composite edge region (205) to one another. For this purpose, the two composite edge regions are pressed against one another in the sealing station.

FIG. 3 shows a further execution of the device (100) of the invention. The device consists of a modified Diana folded-box bonding machine from the Heidelberg company, Heidelberg, Germany. The device (100) includes a sheetlike composite (200) which includes the layer sequence according to FIG. 1a. In addition, the sheetlike composite (200) includes a first composite edge region (204) and a second composite edge region (205) as shown in FIG. 1b. The device (100) further includes, in flow direction (1300), an individualization unit (105) which enables a sheetlike composite to be pulled off from a multitude of stacked sheetlike composites. The individualization unit (105) is a feeder which assures the supply of the sheetlike composite (200) to the transport unit (101). The transport unit (101) is designed to transport the sheetlike composite (200) and consists of a multitude of transport belts. The transport unit (101) transports the sheetlike composite (200) to a peeling unit (102). The peeling unit (102) is a VN 50, Fortuna GmbH, Weil der Stadt, Germany, and is designed to reduce the composite carrier layer (202) and the outer polymer layer (201) in the first composite edge region (204). The sheetlike composite (200) is transported further to a first heating unit (103). The first heating unit (103) is designed to heat the first composite edge region (204). The first heating unit (103) is a hot air nozzle made of stainless steel as shown in FIG. 4. The hot air nozzle has a length of 100 cm and is designed with 70 exit orifices (401) that have a length (mm)/width (mm) ratio of 10. The internal cross section of the entry region (410) is 500 mm², and the sum total of the internal cross-sectional areas of the exit orifices (411) is 120 mm². The sheetlike composite (200) is transported further to an ionization unit (106). The ionization unit (106) is a plasma nozzle from Plasmatreat GmbH, Steinhagen, Germany, and is designed to ionize the polyolefin melt of the sheetlike composite (200) which is generated in the heating unit (103). Thereafter, the sheetlike composite (200) is transported to a contacting unit (104). The contacting unit (104) is designed to contact the first composite edge region (204) with the second composite edge region (205). The contacting unit (104) is a sealing station that seals the first composite edge region (204) and the second composite edge region (205) to one another. For this purpose, the two composite edge regions are pressed against one another in the sealing station.

FIG. 4 shows a schematic of the heating unit (103) of the device (100) of the invention. In the heating unit (103), 80 energy release segments (406) are mounted laterally to the flow direction of the sheetlike composite (200). But the energy release segments (406) are aligned in the direction of the transport surface (111, not shown). Between the energy release segments (406) and the transport surface (111), the sheetlike composite (200) moves in flow direction (1300). The heating unit (103) further includes an entry orifice (402) to accommodate a hot gas (444), which, in this example, is electrically heated ambient air. The entry orifice (402) of the heating unit (103) has an internal cross-sectional area (410) of 800 mm². In addition, the heating unit (103) contains a first energy release segment (407) and, at a distance of 100 cm, a last energy release segment (408). The energy release segments in this example take the form of exit orifices (401). The sum total of the cross-sectional areas of the exit orifices (401, 411) is 250 mm². The sheetlike composite (200) is run past the exit orifices (401) of the heating unit (103) at a distance (405) of 10 mm. The temperature T1 (403) is 480° C. The temperature Tn (404) is 440° C.

FIG. 4a shows a schematic of the heating unit (103) of the device (100) of the invention. In the heating unit (103), 80 energy release segments (406) are mounted laterally to the flow direction of the sheetlike composite (200). But the energy release segments (406) are aligned in the direction of the transport surface (111, not shown). The energy release segments in this example take the form of exit orifices (401). The length of the exit orifices (409) is 10 mm. The ratio of the length (409) to the width (412) of the exit orifice is 10.

FIG. 5 shows a first embodiment of a method (300) of the invention as a flow diagram. In a method step a) (301) of the method (300), a sheetlike composite (200) is provided. This comprises, as mutually superposed layers, a composite color layer (209), an outer polymer layer (201), a composite carrier layer (202), a barrier layer (215) and a composite plastic layer (203) as shown in FIG. 1a. In addition, the sheetlike composite (200), as shown in FIG. 1b, includes a first composite edge region (204) and a second composite edge region (205). In a method step b) (302), a multitude of sheetlike composites (200) are individualized and the individualized sheetlike composite (200) is accelerated to a speed of 350 m/min. In method step d) (304), by heating with the aid of the heating unit (103), the first composite edge region (204) is heated to a temperature of 140° C. at a speed of 350 m/min, where the temperature T1 (403) of the hot gas (444) at the first energy release segment (407) of the heating unit (103) is 480° C. and the temperature Tn (404) of the hot gas (444) at the last energy release segment (408) of the heating unit (103) downstream of the temperature T1 (403) is 440° C. In a method step e) (305), the first composite edge region (204) and the second composite edge region (205) are pressed against one another, and sealed to one another, such that the first overlap region (250) and the second overlap region (260) are formed. Thus, a longitudinal seam (1001) is produced from the first overlap region (250) and the second overlap region (260), which results in formation of a packaging precursor (1000) in shell form for a single container (1200) from the folded sheetlike composite (200).

FIG. 6 shows a further embodiment of a method (300) of the invention as a flow diagram. In a method step a) (301) of the method (300), a sheetlike composite (200) is provided. This comprises, as mutually superposed layers, a composite color layer (209), an outer polymer layer (201), a composite carrier layer (202), a barrier layer (215) and a composite plastic layer (203) as shown in FIG. 1a. In addition, the sheetlike composite (200), as shown in FIG. 1b, includes a first composite edge region (204) and a second composite edge region (205). In a method step b) (302), a multitude of sheetlike composites (200) are individualized and the individual sheetlike composite (200) is accelerated to a speed of 450 m/min. In method step c) (303), by peeling with the aid of the peeling unit (102), the thickness of the sheetlike composite (206) is reduced by 50%, in that the outer polymer layer (201) and part of the composite carrier layer (202) are reduced. The peeling is effected at a speed of 450 m/min. In method step d) (304), the first composite edge region (204) is heated to a temperature of 140° C. at a speed of 450 m/min, where the temperature T1 (403) of the hot gas (444) at the exit orifice (401) of the heating unit (103) is 480° C. and the temperature Tn (402) of the hot gas (444) at the exit orifice (401) of the heating unit (103) downstream of the temperature T1 (403) is 440° C. In a method step d)1 (306), the molten composite plastic layer (203) is ionized with the aid of the ionization unit (106) in the form of a plasma nozzle from Plasmatreat GmbH, Steinhagen, Germany. In a method step e) (305), the first composite edge region (204) and the second composite edge region (205) are pressed against one another and sealed to one another. Thus, a longitudinal seam (1001) is produced, which results in formation of a packaging precursor (1000) in shell form for a single container (1200) from the folded sheetlike composite (200).

FIG. 7 shows a schematic diagram of a shell-like packaging precursor (1000) of the invention, which has been formed by an overlap of the first composite edge region (204) and the second composite edge region (205) in a first overlap region (250) and a second overlap region (260) from a sheetlike composite (200). The first overlap region (250) and the second overlap region (260) form a longitudinal seam of the packaging precursor. The packaging precursor has been formed by folding at 4 folding sites from the sheetlike composite. The packaging precursor surrounds an interior (1108). The width of the first overlap region (250) is 7 mm. The width of the second overlap region (260) is 6 mm. In addition, the composite carrier layer (202) contains a covered hole (1105). Also shown are the regions for the withdrawal of the sample for measurement of the seam strength (1400) according to the above-specified test method.

FIG. 8 shows a schematic cross-sectional diagram of a detail of the first overlap region (250) and the second overlap region (260) of a packaging precursor (1000) of the invention, as shown in FIG. 7, produced from a sheetlike composite (200). In this case, the interior (1108) is below the first and second overlap regions. The first overlap region (250) and the second overlap region (260) adjoin one another. The first overlap region (250) comprises a layer sequence from an inner surface (1106) to an outer surface (1107) of mutually bonded layers: a first composite plastic layer (213), a first composite carrier layer (207), an outer polymer layer (201), a composite color layer (209), a second composite plastic layer (214) and a second composite carrier layer (208). In the first overlap region (250), all superposed layers are bonded to one another.

The second overlap region (260) comprises a layer sequence from an inner surface (1106) to an outer surface (1107) of mutually bonded layers: a first composite plastic layer (213), a first composite carrier layer (210), a second composite carrier layer (211), where the first composite carrier layer (210) and the second composite carrier layer (211) have been provided by peeling and folding from the first composite carrier layer (207), a third composite plastic layer (216), a second composite plastic layer (214) and a third composite carrier layer (212). The first composite carrier layer (210) is not bonded to the second composite carrier layer (211) in the second overlap region (260). Moreover, the third composite carrier layer (212) in the second overlap region (260) has a greater layer thickness than each of the first composite carrier layer (210) and the second composite carrier layer (211). The layer thickness of the first composite carrier layer (210) and the second composite carrier layer (211) in the second overlap region (260) is 60% of the layer thickness of the third composite carrier layer (212) in the second overlap region (260).

FIG. 9 shows the schematic cross-sectional diagram of a detail of a packaging precursor (1000) of the invention, as shown in FIG. 8, produced from a sheetlike composite (200). The external seal (270) is made between composite color layer (209) and the second composite plastic layer (214). The internal seal (270) is made between the third composite plastic layer (216) and the second composite plastic layer (214).

FIG. 10 shows a closed container (1200) of the invention. The closed container (1200) was obtained by folding and closing the packaging precursor from FIG. 7. Closure was effected by sealing the base region (1104) with hot air and the top region (1103) with ultrasound in a filling machine (CFA712, SIG Combibloc, Germany). The container is filled with a food or drink product in an aseptic zone between the sealing of the base region with hot air and the closing of the top region with ultrasound. Subsequently, the closed container (1200) is provided with an opening aid (1202) on the outer surface (1107). The hole (1105) is covered here by a lid of the opening aid (1202).

LIST OF REFERENCE SIGNS

100 Device of the invention
101 Transport unit
102 Peeling unit
103 First heating unit
104 Contacting unit
105 Individualizing unit
106 Ionization unit
108 Further heating unit
111 Transport surface
200 Sheetlike composite
201 Outer polymer layer
202 Composite carrier layer
203 Composite plastic layer
204 First composite edge region
205 Second composite edge region
206 Thickness of the sheetlike composite
207 First composite carrier layer in the first overlap region (250)
208 Second composite carrier layer in the first overlap region (250)
209 Composite color layer 210 First composite carrier layer in the second overlap region (260)
211 Second composite carrier layer in the second overlap region (260)
212 Third composite carrier layer in the second overlap region (260)
213 First composite plastic layer
214 Second composite plastic layer
215 Barrier layer
216 Third composite plastic layer in the second overlap region (260)
217 Subregion of the first composite edge region
250 First overlap region
260 Second overlap region
270 External seal
280 Internal seal
300 Method according to the invention for production of a sheetlike composite
301 Method step a)
302 Method step b)
303 Method step c)
304 Method step d)
305 Method step e)
306 Method step d) 1
401 Exit orifices
402 Entry orifice
403 Temperature T1
404 Temperature Tn
405 Distance between exit orifices and sheetlike composite
406 Energy release segments
407 First energy release segment
408 Last energy release segment
409 Length of the energy release segment
410 Internal cross-sectional area of the entry orifice
411 Sum total of the internal cross-sectional areas of the energy release segments
412 Width of the energy release segment
444 Hot gas
445 Hot air
1000 Packaging precursor
1001 Longitudinal seam
1102 Grooves
1103 Top region
1104 Base region
1105 Hole
1106 Internal surface of the sheetlike composite
1107 External surface of the sheetlike composite
1108 Interior
1200 Container
1201 Food or drink product
1202 Opening aid
1300 Flow direction
1400 Sample for seam strength measurement

The invention claimed is:

1. A device for production of a packaging precursor, wherein the packaging precursor consists to an extent of at least 80% by weight, based on the packaging precursor, of a sheetlike composite, wherein the composite includes:
   i. a composite plastic layer,
   ii. a composite carrier layer,
   iii. a first composite edge region,
   iv. a second composite edge region,
   wherein the device includes, as device constituents in a flow direction:
   a) a transport unit designed to transport the sheetlike composite, wherein the transport unit includes a transport surface designed to bear the composite; downstream of that:
   b) a first heating unit designed to heat the first composite edge region, where the first heating unit includes at least 5 energy release segments; downstream of that:
   c) a contacting unit designed to bond the first composite edge region to the second composite edge region;
   wherein, along the flow direction, the first heating unit is designed to release energy,
   wherein the first heating unit includes, in the flow direction, a first energy release segment and, in the flow direction, a last energy release segment furthest removed from the first energy release segment,
   wherein the first energy release segment is designed to release a higher heating power than the last energy release segment, and
   wherein the at least 5 of the energy release segments each have, in the flow direction, a length which is longer than an extent of the respective energy release segment transverse to the flow direction.

2. The device as claimed in claim 1, wherein the first heating unit comprises an entry orifice through which gas can flow, wherein at least one of the following criteria is fulfilled:
   a) the entry orifice is provided opposite the energy release segments;
   b) the entry orifice is provided with a smaller distance from the first energy release segment than from the last energy release segment;
   c) the entry orifice has a greater internal cross-sectional area than the sum total of the internal cross-sectional areas of all energy release segments.

3. The device as claimed in claim 1, wherein a distance between an exit orifice of the first heating unit and the transport surface is at most as high as a length of the exit orifices of the first heating unit in the flow direction.

4. The device as claimed in claim 1, wherein the device includes the sheetlike composite.

5. A method of producing a package precursor, comprising, as method steps,
   a) providing the device as claimed in claim 1 and the sheetlike composite;
   b) accelerating the sheetlike composite by the transport unit;
   d) heating the first composite edge region by the first heating unit;
   e) bonding the first composite edge region to the second composite edge region by the contacting unit,
   wherein, in method step d), a first temperature in a region between the transport surface and the first energy release segment is T1, and a second temperature in a further region between the transport surface and the last energy release segment is Tn.

6. The method as claimed in claim 5, wherein method step d) includes heating by thermal convection.

7. The method as claimed in claim 5, wherein, in method step d), a gaseous heat flow at an exit orifice of the first heating unit has a greater flow rate than at an entry orifice of the first heating unit.

8. The method as claimed in claim 5, wherein, in a method step c) a thickness of the sheetlike composite at least in a subregion of the first composite edge region is reduced by more than 40% of the thickness of the sheetlike composite.

* * * * *